US011157704B2

(12) United States Patent
Patel et al.

(10) Patent No.: US 11,157,704 B2
(45) Date of Patent: Oct. 26, 2021

(54) CONSTRAINED NATURAL LANGUAGE PROCESSING

(71) Applicant: DataChat.ai, Madison, WI (US)

(72) Inventors: Jignesh Patel, Madison, WI (US); Navneet Sankara Potty, Madison, WI (US)

(73) Assignee: DataChat.ai, Madison, WI (US)

( * ) Notice: Subject to any disclaimer, the term of this patent is extended or adjusted under 35 U.S.C. 154(b) by 136 days.

(21) Appl. No.: 16/441,915

(22) Filed: Jun. 14, 2019

(65) Prior Publication Data

US 2019/0384815 A1    Dec. 19, 2019

Related U.S. Application Data

(60) Provisional application No. 62/686,331, filed on Jun. 18, 2018.

(51) Int. Cl.
| | | |
|---|---|---|
| *G06F 40/30* | (2020.01) | |
| *G06F 40/211* | (2020.01) | |
| *G06F 40/253* | (2020.01) | |
| *G06F 40/295* | (2020.01) | |

(52) U.S. Cl.
CPC ............ *G06F 40/30* (2020.01); *G06F 40/211* (2020.01); *G06F 40/253* (2020.01); *G06F 40/295* (2020.01)

(58) Field of Classification Search
CPC ........... G06F 40/00–58; G06F 16/3329; G06F 16/3344
USPC ........................... 704/1, 9, 10, 257, 270–275
See application file for complete search history.

(56) References Cited

U.S. PATENT DOCUMENTS

| | | | |
|---|---|---|---|
| 5,682,539 A | 10/1997 | Conrad et al. | |
| 9,665,662 B1 | 5/2017 | Gautam et al. | |
| 2005/0091036 A1* | 4/2005 | Shackleton | G06F 40/205 704/9 |
| 2005/0273336 A1* | 12/2005 | Chang | G06F 40/30 704/257 |

(Continued)

FOREIGN PATENT DOCUMENTS

WO    2018009369 A1    1/2018

OTHER PUBLICATIONS

Whitty, Robin "The Chomsky Hierarchy" London South Bank University, Touring Turing, Rewley House, Jul. 2012, 13 pp.
Richardson, John H. "AI Chatbots Try to Schedule Meetings without Enraging Us" Wired.com, available at https://www.wired.com/story/xai-meeting-ai-chatbot/ (last accessed Jun. 13, 2019), May 24, 2018, 9 pp.

(Continued)

*Primary Examiner* — Jesse S Pullias
(74) *Attorney, Agent, or Firm* — Shumaker & Sieffert, P.A.

(57) ABSTRACT

In general, techniques are described by which to provide constrained natural language processing. A device comprising a processor and a memory may be configured to perform the techniques. The processor may expose a language sub-surface specifying a natural language containment hierarchy defining a grammar for a natural language as a hierarchical arrangement of language sub-surfaces. The processor may also receive the data indicative of the input that conforms with the portion of the language provided by the exposed language sub-surface, and process the data indicative of the input to identify an intent of the user from a plurality of intents associated with the portion of the language. The processor may next execute a process associated with the identified intent to perform an operation. The memory may store the data indicative of the input.

32 Claims, 13 Drawing Sheets

(56) References Cited

U.S. PATENT DOCUMENTS

| | | | | |
|---|---|---|---|---|
| 2009/0119095 | A1* | 5/2009 | Beggelman | G06F 40/30 704/9 |
| 2011/0119047 | A1* | 5/2011 | Ylonen | G06F 40/30 704/9 |
| 2012/0016678 | A1* | 1/2012 | Gruber | G06F 40/30 704/275 |
| 2012/0065960 | A1* | 3/2012 | Iwama | G06F 40/211 704/9 |
| 2013/0332481 | A1 | 12/2013 | Lau et al. | |
| 2015/0331850 | A1* | 11/2015 | Ramish | G06F 40/40 704/9 |
| 2015/0339376 | A1 | 11/2015 | Wieweg et al. | |
| 2016/0162473 | A1* | 6/2016 | Cogley | G06F 40/51 704/9 |
| 2016/0179934 | A1* | 6/2016 | Stubley | G06N 5/00 707/722 |
| 2017/0116982 | A1 | 4/2017 | Gelfenbeyn et al. | |

OTHER PUBLICATIONS

International Search Report and Written Opinion of International Application No. PCT/US2019/037477, dated Sep. 26, 2019, 14 pp.

International Preliminary Report on Patentability from International Application No. PCT/US2019/037477, dated Dec. 30, 2020, 8 pp.

Response to Communication Pursuant to Rules 161(1) and 162 EPC dated Jan. 27, 2021, from counterpart European Application No. 19735062.2, filed Jul. 30, 2021, 37 pp.

\* cited by examiner

DataChat

Jmp | Sales Manager Productivity

Sure, you can now refer tot his data by the name initial.

There were 387 deals that the team worked on between 2015 and 2017, winning 52 (13%) and losing 213 (55%) deals. The overall win-loss ratio was 24%. Win-loss ratio increased by 13% from 2015 to 2016 and dropped by 12% from 2016 to 2017.

Ms. Scott: Worked on 5% of the overall deals (7%, 7% and 3% of the overall deals in years 2015, 2016 and 2017 respectively), and his/her win-loss performance increased from 0% to 75% between 2015 and 2016 and dropped by 73% from 2016 to 2017.

What can I do next?

Show me the ratio of wins to losses for each state

OK, I have calculated the wins to lossses ratio for you. Here are the results.

Anything else I can do for you?

|    | State | Lost | NOI | Win | All | WinToLossRatio | ProportionWins |
|----|-------|------|-----|-----|-----|----------------|----------------|
| 0  | AK    | 0.0  | 2.0 | 1.0 | 3   | inf            | 0.33           |
| 1  | AL    | 0.0  | 3.0 | 1.0 | 4   | inf            | 0.25           |
| 2  | AR    | 6.0  | 0.0 | 0.0 | 6   | 0.00000        | 0.00           |
| 3  | AS    | 4.0  | 1.0 | 0.0 | 5   | 0.25           | 0.17           |
| 4  | AZ    | 7.0  | 0.0 | 1.0 | 8   | 0.140          | 0.12           |
| 5  | CA    | 6.0  | 1.0 | 0.0 | 7   | 0.00           | 0.00           |
| 6  | CO    | 2.0  | 3.0 | 0.0 | 5   | 0.00           | 0.00           |
| 7  | CT    | 4.0  | 3.0 | 1.0 | 8   | 0.25           | 0.12           |
| 8  | DC    | 5.0  | 0.0 | 1.0 | 6   | 0.20           | 0.17           |
| 9  | DE    | 5.0  | 0.0 | 0.0 | 5   | 0.00           | 0.00           |
| 10 | FL    | 5.0  | 1.0 | 1.0 | 7   | 0.20           | 0.14           |
| 11 | FM    | 2.0  | 1.0 | 1.0 | 4   | 0.50           | 0.25           |
| 12 | GA    | 3.0  | 3.0 | 1.0 | 7   | 0.33           | 0.14           |
| 13 | GU    | 2.0  | 2.0 | 1.0 | 5   | 0.50           | 0.20           |
| 14 | HI    | 5.0  | 0.0 | 2.0 | 7   | 0.40           | 0.29           |
| 50 | TX    | 2.0  | 6.0 | 1.0 | 9   | 0.50           | 0.11           |
| 39 | NY    | 1.0  | 3.0 | 1.0 | 5   | 1.00           | 0.20           |
| 26 | MI    | 2.0  | 3.0 | 0.0 | 5   | 0.00           | 0.00           |
| 23 | MD    | 5.0  | 2.0 | 2.0 | 9   | 0.40           | 0.22           |
| 51 | UT    | 6.0  | 2.0 | 0.0 | 8   | 0.00           | 0.00           |

FIG. 3D

DataChat

Jmp | Sales Manager Productivity

Ms. Scott: Worked on 5% of the overall deals (7%, 7% and 3% of the overall deals in years 2015, 2016 and 2017 respectively), and his/her win-loss performance increased from 0% to 75% between 2015 and 2016 and dropped by 73% from 2016 to 2017.

What can I do next?

Show me the ratio of wins to losses for each state

OK, I have calculated the wins to losses ratio for you. Here are the results.

Anything else I can do for you?

Show me the ratio of wins to losses in the year 2017

OK, I have calculated the wins to losses ratio for you. Here are the results.

How can I help you?

Hold on, I'm on it ...

| | | Lost | NOI | Win | All | | |
|---|---|---|---|---|---|---|---|
| 4 | AZ | 7.0 | 0.0 | 8 | | 0.140 | 0.12 |
| 5 | CA | 6.0 | 1.0 | 7 | | 0.00 | 0.00 |
| 6 | CO | 2.0 | 3.0 | 5 | | 0.00 | 0.00 |
| 7 | CT | 4.0 | 3.0 | 8 | | 0.25 | 0.12 |
| 8 | DC | 5.0 | 0.0 | 6 | | 0.20 | 0.17 |
| 9 | DE | 5.0 | 1.0 | 5 | | 0.00 | 0.00 |
| 10 | FL | 5.0 | 1.0 | 7 | | 0.20 | 0.14 |
| 11 | FM | 2.0 | 1.0 | 4 | | 0.50 | 0.25 |
| 12 | GA | 3.0 | 3.0 | 7 | | 0.33 | 0.14 |
| 13 | GU | 2.0 | 2.0 | 5 | | 0.50 | 0.20 |
| 14 | HI | 5.0 | 0.0 | 7 | | 0.40 | 0.29 |
| 50 | TX | 2.0 | 6.0 | 9 | | 0.50 | 0.11 |
| 39 | NY | 1.0 | 3.0 | 5 | | 1.00 | 0.20 |
| 26 | MI | 2.0 | 3.0 | 5 | | 0.00 | 0.00 |
| 23 | MD | 5.0 | 2.0 | 9 | | 0.40 | 0.22 |
| 51 | UT | 6.0 | 2.0 | 8 | | 0.00 | 0.00 |

| Opportunity Owner | Lost | NOI | Win | All | WinToLossRatio | ProportionWins |
|---|---|---|---|---|---|---|
| Chelsea Scott | 5.0 | 0.0 | 1.0 | 6 | 0.20 | 0.17 |
| Dr. James Simmons | 65.0 | 33.0 | 14.0 | 112 | 0.22 | 0.12 |
| James Palmer | 39.0 | 12.0 | 7.0 | 58 | 0.18 | 0.12 |
| Jennifer Keller | 3.0 | 3.0 | 1.0 | 7 | 0.33 | 0.14 |
| Laura Sullivan | 2.0 | 6.0 | 3.0 | 11 | 1.50 | 0.27 |
| Thomas Maldonado | 1.0 | 0.0 | 1.0 | 2 | 1.00 | 0.50 |
| All | 115.0 | 54.0 | 27.0 | 196 | 0.23 | 0.14 |

DataChat

Jmp | Sales Manager Productivity

How can I help you?

Show me the average age wins in the year 2017

OK, I have calculated theAverageAge for you. Here are the results.

Alright, what's next?

List datasets

Show
Sample
Save
Describe
List
Use

|  |  |  |  |  |
|---|---|---|---|---|
| Chelsea Scott | 5.0 | 0.0 | 1.0 | 6 | 0.20 | 0.17 |
| Dr. James Simmons | 65.0 | 33.0 | 14.0 | 112 | 0.22 | 0.12 |
| James Palmer | 39.0 | 12.0 | 7.0 | 58 | 0.18 | 0.12 |
| Jennifer Keller | 3.0 | 3.0 | 1.0 | 7 | 0.33 | 0.14 |
| Laura Sullivan | 2.0 | 6.0 | 3.0 | 11 | 1.50 | 0.27 |
| Thomas Maldonado | 1.0 | 0.0 | 1.0 | 2 | 1.00 | 0.50 |
| All | 115.0 | 54.0 | 27.0 | 196 | 0.23 | 0.14 |

| | AverageAge |
|---|---|
| 0 | 201.33 |

| | Name | NumRows | NumColumns | Columns |
|---|---|---|---|---|
| 0 | explanation_results | 4 | 7 | Year, Lost, NOI, Win, All, WinToLossRatio, ProportionWins |
| 1 | opp_explantation_results | 7 | 7 | OpportunityOwner, Lost, NOI, Win, All, WinToLossRatio, ProportionWins |
| 2 | Initial | 387 | 19 | AccountName, State, Stage, CloseMonth, CloseDate, TotalLoans, ResidentialOLFee, ProjectedAnnualRevenue, LeadSource, OpportunityName, FiscalPeriod, Age, CreatedDate... |

FIG. 3H

CONSTRAINED NATURAL LANGUAGE PROCESSING

This application claims the benefit of U.S. Provisional Application No. 62/686,331, filed Jun. 18, 2018, the entire content of which is hereby incorporated by reference.

TECHNICAL FIELD

This disclosure relates to computing and data analytics systems, and more specifically, systems using natural language processing.

BACKGROUND

Natural language processing generally refers to a technical field in which computing devices process user inputs provided by users via conversational interactions using human languages. For example, a device may prompt a user for various inputs, present clarifying questions, present follow-up questions, or otherwise interact with the user in a conversational manner to elicit the input. The user may likewise enter the inputs as sentences or even fragments, thereby establishing a simulated dialog with the device to specify one or more intents (which may also be referred to as "tasks") to be performed by the device.

During this process the device may present various interfaces by which to present the conversation. An example interface may act as a so-called "chatbot," which often is configured to attempt to mimic human qualities, including personalities, voices, preferences, humor, etc. in an effort to establish a more conversational tone, and thereby facilitate interactions with the user by which to more naturally receive the input. Examples of chatbots include "digital assistants" (which may also be referred to as "virtual assistants"), which are a subset of chatbots focused on a set of tasks dedicated to assistance (such as scheduling meetings, make hotel reservations, and schedule delivery of food).

There are a number of different natural language processing algorithms utilized to parse the inputs to identify intents, some of which depend upon machine learning. However, natural languages often do not follow precise formats, and various users may have slightly different ways of expressing inputs that result in the same general intent, resulting in so-called "edge cases" that many natural language algorithms, including those that depend upon machine learning, are not programed (or, in the context of machine language, trained) to specifically address.

SUMMARY

In general, this disclosure describes techniques for constrained natural language processing (CNLP) that expose language sub-surfaces in a constrained manner thereby removing ambiguity and aiding discoverability. In general, a natural language surface refers to the permitted set of potential user inputs (e.g., utterances), i.e., the set of utterances that the natural language processing system is capable of correctly processing.

The CNLP techniques described herein may provide several technical advantages in the design of systems with natural language interfaces such as chatbots and virtual assistants. First, the CNLP techniques may restrict the language surface to a set of utterances that may be identified and acted upon by the system. The techniques may allow the initial language surface to be tailored to eliminate/minimize ambiguity, ensuring that a user may not possibly become frustrated or misled.

Second, the structure of the constrained language surface permits a structured discovery process, which may, when coupled with an auto-complete mechanism also described herein, allow the user to understand capabilities and limitations of the CNLP system without potentially undergoing a long training phase. Further, the discovery process may allow the system designers to expose a large amount of functionality in the system while minimizing the cognitive burden imposed on the user.

Third, various aspects of the techniques may allow system designers to decompose (or, in other words, "break down") the language surface into sub-surfaces that are only exposed to the user when certain conditions are met. The conditions may be related to the user's preferences or capabilities (e.g., certain utterances that are more complex may only be permitted when the user has acknowledged or demonstrated technical sophistication), or to the context of the user session (e.g., certain utterances may only be permitted if their prerequisites have been met through prior utterances).

Taken together, the CNLP techniques may allow building of systems with user interfaces that are easier to use (e.g., in terms of potentially requiring little training and limiting cognitive overhead), while possibly programmatically recognizing a large variety of intents with high precision, to support users with diverse needs and levels of sophistication. As such, the techniques may permit system designs that achieve a balance of capability and usability compared to existing chatbot or virtual assistant frameworks.

In this sense, the CNLP techniques may promote better operation of a system that interfaces with users according to a natural language interface, such as so-called "digital assistants" or "chatbots." Rather than consume processing cycles attempting to process ambiguous inputs from which multiple different meanings can be parsed, and presenting follow-up questions to ascertain the precise meaning the user intended by the input, the CNLP techniques may result in more efficient processing of the user input by limiting the available language to one or more sub-surfaces. The reduction in processing cycles may improve the operation of the CNLP system as less power is consumed, less state is generated resulting in reduced memory consumption and less memory bandwidth is utilized (both of which also further reduce power consumption), and more processing bandwidth is preserved for other processes.

In one aspect, the techniques are directed to a device configured to process data indicative of an input, the device comprising: one or more processors configured to expose a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input. The one or more processors are also configured to receive the data indicative of the input that conforms with the portion of the language provided by the exposed language sub-surface, process the data indicative of the input to identify an intent of the user from a plurality of intents associated with the portion of the language, and execute a process associated with the identified intent to perform an operation. The device may also include a memory configured to store the data indicative of the input.

In another aspect, the techniques are directed to a method of processing data indicative of an input, the method comprising: exposing a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input; receiving the data indicative of the input that conforms with the portion of the language provided by the exposed language sub-surface; processing the data indicative of the input to identify an intent of the user from a plurality of intents associated with the portion of the language; and executing a process associated with the identified intent to perform an operation.

In another aspect, the techniques are directed to a device for processing data indicative of an input, the device comprising: means for exposing a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input; means for receiving the data indicative of the input that conforms with the portion of the language provided by the exposed language sub-surface; means for processing the data indicative of the input to identify an intent of the user from a plurality of intents associated with the portion of the language; and means for executing a process associated with the identified intent to perform an operation.

In another aspect, the techniques are directed to a computer-readable medium having stored thereon instruction that, when executed, cause one or more processors to: expose a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter data indicative of an input; receive the data indicative of the input that conforms with the portion of the language provided by the exposed language sub-surface; process the data indicative of the input to identify an intent of the user from a plurality of intents associated with the portion of the language; and execute a process associated with the identified intent to perform an operation.

In another aspect, the techniques are directed to a system configured to process data indicative of an input, the system comprising: a host device comprising one or more processors configured to: expose a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input; and a client device comprising one or more processors configured to: receiving the data indicative of the input that conforms with the portion of the language provided by the exposed language sub-surface; and output the data indicative of the input to the host device. The one or more processors of the host device are further configured to: process the data indicative of the input to identify an intent of the user from a plurality of intents associated with the portion of the language; and execute a process associated with the identified intent to perform an operation.

The details of one or more aspects of the techniques are set forth in the accompanying drawings and the description below. Other features, objects, and advantages of these techniques will be apparent from the description and drawings, and from the claims.

BRIEF DESCRIPTION OF DRAWINGS

FIGS. 3A-3H are diagrams illustrating interfaces presented by the interface unit of the host device shown in FIG. 1 that facilitate sales manager productivity analytics via the sales manager productivity application shown in FIG. 2 in accordance with various aspects of the CNLP techniques described in this disclosure.

DETAILED DESCRIPTION

Figure 1:
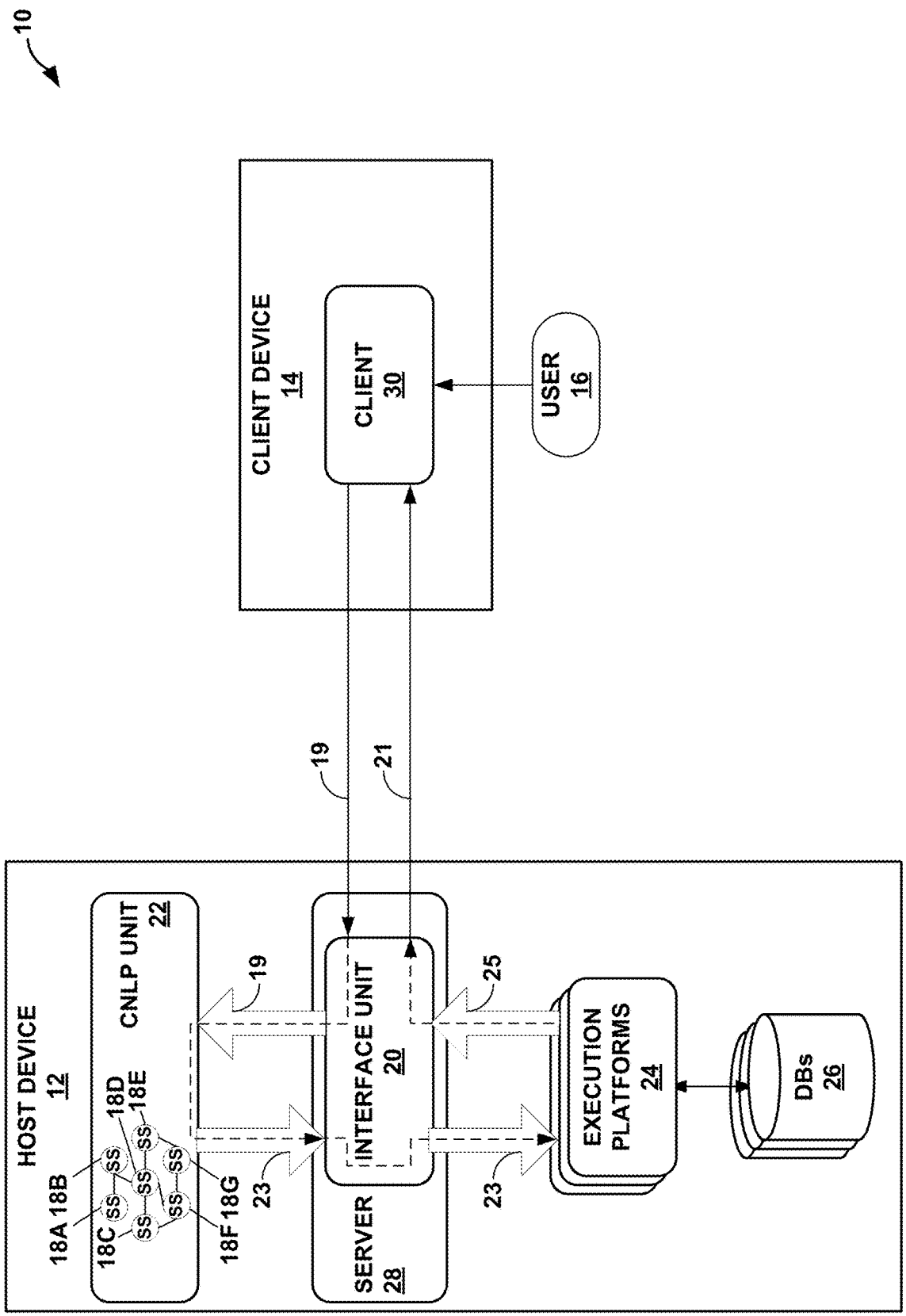
FIG. 1 is a block diagram illustrating a system that may perform various aspects of the techniques described in this disclosure.

FIG. 1 is a diagram illustrating a system 10 that may perform various aspects of the techniques described in this disclosure for constrained natural language processing (CNLP). As shown in the example of FIG. 1, system 10 includes a host device 12 and a client device 14. Although shown as including two devices, i.e., host device 12 and client device 14 in the example of FIG. 1, system 10 may include a single device that incorporates the functionality described below with respect to both of host device 12 and client device 14, or multiple clients 14 that each interface with one or more host devices 12 that share a mutual database hosted by one or more of the host devices 12.

Host device 12 may represent any form of computing device capable of implementing the techniques described in this disclosure, including a handset (or cellular phone), a tablet computer, a so-called smart phone, a desktop computer, and a laptop computer to provide a few examples. Likewise, client device 14 may represent any form of computing device capable of implementing the techniques described in this disclosure, including a handset (or cellular phone), a tablet computer, a so-called smart phone, a desktop computer, a laptop computer, a so-called smart speaker, so-called smart headphones, and so-called smart televisions, to provide a few examples.

As shown in the example of FIG. 1, host device 12 includes a server 28, a CNLP unit 22, one or more execution platforms 24, and a database 26. Server 28 may represent a unit configured to maintain a conversational context as well as coordinate the routing of data between CNLP unit 22 and execution platforms 24.

Server 28 may include an interface unit 20, which may represent a unit by which host device 12 may present one or more interfaces 21 to client device 14 in order to elicit data 19 indicative of an input and/or present results 25. Data 19 may be indicative of speech input, text input, image input (e.g., representative of text or capable of being reduced to text), or any other type of input capable of facilitating a dialog with host device 12. Interface unit 20 may generate or otherwise output various interfaces 21, including graphical user interfaces (GUIs), command line interfaces (CLIs), or any other interface by which to present data or otherwise provide data to a user 16. Interface unit 20 may, as one example, output a chat interface 21 in the form of a GUI with which the user 16 may interact to input data 19 indicative of the input (i.e., text inputs in the context of the chat server example). Server 28 may output the data 19 to CNLP unit 22 (or otherwise invoke CNLP unit 22 and pass data 19 via the invocation).

CNLP unit 22 may represent a unit configured to perform various aspects of the CNLP techniques as set forth in this disclosure. CNLP unit 22 may maintain a number of interconnected language sub-surfaces (shown as "SS") 18A-18G ("SS 18"). Language sub-surfaces 18 may collectively represent a language, while each of the language sub-surfaces 18 may provide a portion (which may be different portions or overlapping portions) of the language. Each portion may specify a corresponding set of syntax rules and strings permitted for the natural language with which user 16 may interface to enter data 19 indicative of the input. CNLP unit 22 may, as described below in more detail, perform CNLP, based on the language sub-surfaces 18 and data 19, to identify one or more intents 23. CNLP unit 22 may output the intents 23 to server 28, which may in turn invoke one of execution platforms 24 associated with the intents 23, passing the intents 23 to one of the execution platforms 24 for further processing.

Execution platforms 24 may represent one or more platforms configured to perform various processes associated with the identified intents 23. The processes may each perform a different set of operations with respect to, in the example of FIG. 1, databases 26. In some examples, execution platforms 24 may each include processes corresponding to different categories, such as different categories of data analysis including sales data analytics, health data analytics, or loan data analytics, different forms of machine learning, etc. In some examples, execution platforms 24 may perform general data analysis that allows various different combinations of data stored to databases 26 to undergo complex processing and display via charts, graphs, etc. Execution platforms 24 may process the intents 23 to obtain results 25, which execution platforms 24 may return to server 28. Interface unit 20 may generate a GUI 21 that present results 25, transmitting the GUI 21 to client device 14.

In this respect, execution platforms 24 may generally represent different platforms that support applications to perform analysis of underlying data stored to databases 26, where the platforms may offer extensible application development to accommodate evolving collection and analysis of data or perform other tasks/intents. For example, execution platforms 24 may include such platforms as Postgres (which may also be referred to as PostgreSQL, and represents an example of a relational database that performs data loading and manipulation), TensorFlow™ (which may perform machine learning in a specialized machine learning engine), and Amazon Web Services (or AWS, which performs large scale data analysis tasks that often utilize multiple machines, referred to generally as the cloud).

The client device 14 may include a client 30 (which may in the context of a chatbot interface be referred to as a "chat client 30"). Client 30 may represent a unit configured to present interface 21 and allow entry of data 19. Client 30 may execute within the context of a browser, as a dedicated third-party application, as a first-party application, or as an integrated component of an operating system (not shown in FIG. 1) of client device 14.

Returning to natural language processing, CNLP unit 22 may perform a balanced form natural language processing compared to other forms of natural language processing. Natural language processing may refer to a process by which host device 12 attempts to process data 19 indicative of inputs (which may also be referred to as "inputs 19" for ease of explanation purposes) provided via a conversational interaction with client device 14. Host device 12 may dynamically prompt user 16 for various inputs 19, present clarifying questions, present follow-up questions, or otherwise interact with the user in a conversational manner to elicit input 19. User 16 may likewise enter the inputs 19 as sentences or even fragments, thereby establishing a simulated dialog with host device 12 to identify one or more intents 23 (which may also be referred to as "tasks 23").

Host device 12 may present various interfaces 21 by which to present the conversation. An example interface may act as a so-called "chatbot," which may attempt to mimic human qualities, including personalities, voices, preferences, humor, etc. in an effort to establish a more conversational tone, and thereby facilitate interactions with the user by which to more naturally receive the input. Examples of chatbots include "digital assistants" (which may also be referred to as "virtual assistants"), which are a subset of chatbots focused on a set of tasks dedicated to assistance (such as scheduling meetings, make hotel reservations, and schedule delivery of food).

A number of different natural language processing algorithms exist to parse the inputs 19 to identify intents 23, some of which depend upon machine learning. However, natural language may not always follow a precise format, and various users may have slightly different ways of expressing inputs 19 that result in the same general intent 23, some of which may result in so-called "edge cases" that many natural language algorithms, including those that depend upon machine learning, are not programed (or, in the context of machine language, trained) to specifically address. Machine learning based natural language processing may value naturalness over predictability and precision, thereby encountering edge cases more frequently when the trained naturalness of language differs from the user's perceived naturalness of language. Such edge cases can sometimes be identified by the system and reported as an inability to understand and proceed, which may frustrate the user. On the other hand, it may also be the case that the system proceeds with an imprecise understanding of the user's intent, causing actions or results that may be undesirable or misleading.

Other types of natural language processing algorithms utilized to parse inputs 19 to identify intents 23 may rely on keywords. While keyword based natural language processing algorithms may be accurate and predictable, keyword based natural language processing algorithms are not precise in that keywords do not provide much if any nuance in describing different intents 23.

In other words, various natural language processing algorithms fall within two classes. In the first class, machine learning-based algorithms for natural language processing rely on statistical machine learning processes, such as deep neural networks and support vector machines. Both of these machine learning processes may suffer from limited ability to discern nuances in the user utterances. Furthermore, while the machine learning based algorithms allow for a wide variety of natural-sounding utterances for the same intent, such machine learning based algorithms can often be unpredictable, parsing the same utterance differently in successive versions, in ways that are hard for developers and users to understand. In the second class, simple keyword-based algorithms for natural language processing may match the user's utterance against a predefined set of keywords and retrieve the associated intent.

In accordance with the techniques described in this disclosure, CNLP unit 22 may parse inputs 19 (which may, as one example, include natural language statements that may also be referred to as "utterances") in a manner that balances accuracy, precision, and predictability. CNLP unit 22 may achieve the balance through various design decisions when implementing the underlying language surface (which is another way of referring to the collection of sub-surfaces 18, or the "language"). Language surface 18 may represent a set of potential user utterances for which server 28 is capable of parsing (or, in more anthropomorphic terms, "understanding") the intent of the user 16.

The design decisions may negotiate a tradeoff between competing priorities, including accuracy (e.g., how frequently server 28 is able to correctly interpret the utterances), precision (e.g., how nuanced the utterances can be in expressing the intent of user 16), and naturalness (e.g., how diverse the various phrasing of an utterance that map to the same intent of user 16 can be). The CNLP techniques may allow CNLP unit 22 to unambiguously parse inputs 19 (which may also be denoted as the "utterances 19"), thereby potentially ensuring predictable, accurate parsing of precise (though constrained) natural language utterances 19.

In operation, CNLP unit 22 may expose, to an initial user (which user 16 may be assumed to be for purposes of illustration) a select one of language sub-surfaces 18 in a constrained manner, potentially only exposing the select one of the language sub-surfaces 18.

CNLP unit 22 may receive via interface unit 20 input 19 that conforms with the portion of the language provided by the exposed language sub-surface, and process input 19 to identify intent 23 of user 16 from a plurality of intents 23 associated with the language. That is, when designing CNLP unit 22 in support of server 28, a designer may select a set of intents 23 that the server 28 supports (in terms of supporting parsing of input 19 via CNLP unit 22).

Further, CNLP unit 22 may optionally increase precision with respect to each of intents 23 by supporting one or more entities. To illustrate, consider an intent of scheduling a meeting, which may have entities, such as a time and/or venue associated with the meeting scheduling intent, a frequency of repetition of each of the meeting scheduling intent (if any), and other participants (if any) to the schedule meeting intent. CNLP unit 22 may perform the process of parsing to identify that utterance 19 belongs to a certain one of the set of intents 23, and thereafter to extra any entities that may have occurred in the utterance 19.

CNLP unit 22 may associate each of intents 23 provided by the language 18 with one or more patterns. Each pattern supported by CNLP unit 22 may include one or more of the following components:

a) A non-empty set of identifiers that may be present in the utterance for it to be parsed as belonging to this intent. Each identifier may be associated with one or more synonyms whose presence is treated equivalently to the presence of the identifier;

b) An optional set of positional entities which CNLP unit 22 may parse based on where the positional entities occur in the utterance, relative to the identifiers;

c) An optional set of keyword entities, each associated with a keyword (and possibly synonyms thereof). These keyword entities may occur anywhere in the utterance relative to each other; instead of their position, the keyword entities are parsed based on the occurrence of the associated keyword nearby (either before or after) in the utterance;

d) An optional set of prepositional phrase entities, each associated with one or more prepositions (which may include terms such as "for each"). These prepositional phrase entities may be parsed based on the occurrence of the corresponding prepositional phrase;

e) A set of ignored words, which may refer to words that occur commonly in natural language or otherwise carry little utility to interpreting the utterance, such as "the," "a," etc.;

f) A prompt optionally associated with each entity, providing both a description of the entity, as well as a statement that CNLP unit 22 may use to query user 16 and elicit a value for the entity when the value may not be parsed from the utterance; and g) A pattern statement describing a relative order in which the identifiers and entities may occur in the pattern.

As an example, consider that in order to schedule a meeting, CNLP unit 22 may define a pattern as follows. The identifiers may be "schedule" and "meeting", where the word "meeting" may have a synonym "appointment." CNLP unit 22 may capture a meeting frequency as a positional entity from input 19 occurring in the form "schedule a daily meeting" or "schedule a weekly appointment." Such statements may instead be captured as a keyword entity (with keyword "frequency") as in "schedule a meeting at daily frequency" or "schedule an appointment with frequency weekly." CNLP unit 22 may use a prepositional phrase to parse the timing using the preposition "at" as in "I want to schedule the meeting at 5 PM" or "schedule an appointment at noon."

The above examples included a number of words that CNLP unit 22 may be programmed to ignore when parsing, including "a", "an", "the", "I", "want", "to" etc. The timing entity may also include a prompt such as "At what time would you like to have the meeting?," where server 28 may initiate a query asking user 16 if they did not specify a timing in utterance 19. The pattern statement may describe that this pattern requires the identifier "schedule" to occur before "meeting" (or its synonym "appointment") as well as all other entities.

As such, CNLP unit 22 may process input 19 to identify a pattern from a plurality of patterns associated with the language 18, each of the plurality of patterns associated with a different one of the plurality of intents 23. CNLP unit 22 may then identify, based on the identified pattern, intent 23 of user 16 from the plurality of intents associated with the portion of the language.

The pattern may, as noted above include an identifier. To identify the pattern, CNLP unit 22 may parse input 19 to identify the identifier, and then identify, based on the identifier, the pattern. The pattern may include both the identifier and a positional entity. In these instances, CNLP unit 22 may parse input 19 to identify the positional entity, and identify, based on the identifier and the positional identity, the pattern.

Additionally, the pattern may, as noted above, include a keyword. CNLP unit 22 may parse input 19 to identify the keyword, and then identify, based on the keyword, the pattern in the manner illustrated in the examples below.

The pattern may, as noted above, include an entity. When the pattern includes an entity, CNLP unit 22 may determine that input 19 corresponds to the pattern but does not include the entity. CNLP unit 22 may interface with interface unit 22 to output, based on the determination that input 19 corresponds to the pattern but does not include the entity, a prompt via an interface 21 requesting data indicative of additional input specifying the entity. User 16 may enter data 19 indicative of the additional input (which may be denoted for ease of expression as "additional input 19") specifying the entity. Interface unit 22 may receive the additional input 19 and pass the additional input 19 to CNLP unit 22, which may identify, based on the input 19 and additional input 19, the pattern.

The following illustrates a number of examples as to how the constrained parsing occurs relative to various patterns for various data exploration and analysis tasks. The first example pattern named 'load_data_from_file' shows the specification for the intent of loading data from a file as follows:

```
'load_data_from_file':
    Pattern('LOAD data from file <filename>',
        synonyms={
            'load': ['upload', 'import'],
        },
        addnl_ignore=['dataset'],
        entities={
            filename': PositionalEntity(FileName( ),
                "Where is the source file located?"),
        },
    )
```

In the above example, the pattern statement 'LOAD data from file <filename>' defines the identifier LOAD; any user utterance may include either the word load or its synonyms upload or import to express this intent 23. Identifiers are shown in all-caps in the pattern statement.

As shown above, CNLP unit 22 may identify one entity specified: <filename>. Entities are specified in angular brackets in the pattern statement. The filename is defined as a positional entity which must occur after the load keyword. CNLP unit 22 may parse the filename positional entity value using a FileName( ) parser, which may refer to a parser that can read file names containing special characters. The FileName parser may also validate whether a file with that name exists on the system.

The words "data," "from," "file," and "dataset" are useful in expressing the intent in a natural utterance, but may not be necessary for CNLP unit 22 to parse the useful aspects of information (in other words, the intent of loading a file and the file name entity). As such, CNLP unit 22 may ignore the above words.

In the above example implementation, CNLP unit 22 may ignore all words occurring in the pattern statement other than identifiers and entities. CNLP unit 22 may also ignore additional words specified using the addnl_ignore field. CNLP unit 22 may also ignore a few other common English words in this implementation.

According to the above example, utterances 19 that express "Load myfile.csv", "Import data from the file myfile.csv", "Upload the dataset myfile.csv" all express the same intent.

The second example shown below illustrates the pattern named "extract_date_parts" that corresponds to intent 23 of extracting the parts like "day", "month", "year" etc. from a date column in a dataset.

```
'extract_date_parts':
    Pattern('EXTRACT <date_parts> FROM <column> <names_list>',
        addnl_ignore=['using', 'them', 'it'],
        entities={
            'date_parts': PositionalEntity(
                List(OneOf(['day', 'month', 'year', 'hour',
                    'minute', 'second', 'millisecond',
                    'microsecond', 'quarter', 'week', 'decade',
                    'century', 'day of week', 'day of year'])),
                "What parts of the date would you like to extract?"),
            'column': PositionalEntity(Column( ),
                "Which date column would you like to extract from?"),
            'names_list': KeywordEntity(List(Word( )),
                "What would you like to name the new columns?",
                ["names", "calling"]),
        },
    ),
```

The above pattern statement specifies two identifiers EXTRACT and FROM. Note that the word from was ignored in the previous example pattern but CNLP unit 22 is configured to identify FROM as an identifier in the second example pattern.

The second pattern has three entities. The date_parts entity can be a list of parts that the user would like to extract from the date column. Because the date_parts entity is defined as a positional entity, the date_parts entity may occur between the extract and from identifiers in utterance 19. The date parts that user 16 wants to extract can be drawn from the list "day", "month", "year" etc. that is specified in the above second example. CNLP unit 22 may prompt user 16 when any other value is specified in the list.

The column entity in the above second example may also be positional, and may have a value that is the name of some column in an existing dataset stored to a corresponding one of databases 26. The Column parser function (i.e., Column( ) in the above example) invoked by CNLP unit 22 to read this value may identify which dataset stored to a corresponding one of databases 26 user 16 intends to access, correct any typos in the name specified by user 16, etc.

User 16 may also use the names_list entity to specify a list of names for the new columns that contain the date parts extracted from the date column. The names_list entity is a keyword entity, which may only be specified when user 16 specifies the keywords "names" or "calling."

CNLP unit 22 may parse valid utterances using the pattern include "Extract day, month and year from BirthDate" and "Extract month and year from BirthDate, calling them BirthMonth, BirthYear".

The third example shown below provides a pattern named "plot_bubble_chart" that corresponds to intent 23 of visualizing a dataset in the form of a bubble chart.

```
'plot_bubble_chart':
    Pattern('PLOT a BUBBLE CHART with <x_column> <y_column> <size> <color>',
        synonyms={
            'plot': ['draw', 'visualize'],
            'chart': ['graph', 'diagram'],
        },
        entities={
            'x_column': KeywordEntity(Column( ),
                "Which column would you like on the x-axis?",
                ["x-axis", "x axis", "xaxis"]),
            'y_column': KeywordEntity(Column( ),
                "Which column would you like on the y-axis?",
                ["y-axis", "y axis", "yaxis"]),
```

-continued

```
        'size': KeywordEntity(Column( ),
            "Which column would you like to use to size the
            bubbles?",
            ["size", "bubble size", "size of the bubble"]),
        'color': KeywordEntity(Column( ),
            "Which column would you like to use to color the
            bubbles?",
            ["color", "bubble color", "color of the bubble"]),
        },
    ),
```

The third pattern statement shown above specifies the identifiers PLOT, BUBBLE and CHART. Both plot and chart have two synonyms each.

This third pattern has four keyword entities that specify columns to be used for the x- and y-axes of the chart, as well as to size and color the bubbles. Just as in the previous example, CNLP unit 22 invokes the Column parser to read the column names, correcting for typographical errors ("typos").

An example utterance for this pattern is "Plot a bubble chart with x-axis Year, y-axis Population using bubble color Continent and size of the bubble GDP".

The fourth example shown below provides a pattern named "move legend" that corresponds to intent 23 of changing the position of the legend in a chart.

```
'move_legend':
    Pattern('MOVE the LEGEND to <position>',
        addnl_ignore=['chart'],
        entities={
        'position': PositionalEntity(OneOf(
            ['top', 'bottom', 'left', 'right']),
            "Where would you like to move the legend?")
        },
        only_after=['plot_bubble_chart', 'plot_line_chart']
    )
```

In the forgoing, the "only_after" field introduced here specifies that the field only makes sense to move the legend around after having plotted a chart. Thus, user 16 may only invoke intent 23 after invoking one of specified intents 23.

In the fifth example that follows a pattern named "show_loans" is provided that is specific to the domain of loans analysis in finance.

```
'show_loans':
    Pattern('SHOW me the LOANS <approval_year> <state>',
        entities={
        'approval_year': KeywordEntity(Year( )),
            "When should the loans have been approved?",
            ['approved']),
        'state': KeywordEntity(Word( )),
            "Which state should the loans have been approved
in?",
            ['state']),
        },
    )
```

The fifth pattern may permit utterances 19 such as "Show me the loans approved in 2016" and "Show me the loans approved in 2018 in the state of Wisconsin."

The fifth pattern may illustrate how it is possible to customize the language surface understood by CNLP unit 22 to a particular domain. In some examples, the underlying implementation of above intent 23 may use more generic intents such as filter_data that may use the language of tables, rows, columns, etc.

CNLP unit 22 may provide a platform by which to execute the foregoing pattern parsers to identify different intents 23. The platform provided by CNLP unit 22 may be extensible allowing for development, refinement, addition or removal of pattern parsers. CNLP unit 22 may, as noted above, utilize entity parsers imbedded in the pattern parsers to extract various entities. When various entities are not specified in input 19, CNLP unit 22 may invoke prompts, which are also embedded in the pattern parses per the examples above. CNLP unit 22 may receive, responsive to outputting the prompts, additional inputs 19 specifying the unspecified entities, and thereby parse input 19 to identify patterns, which may be associated with intent 23.

In this way, CNLP unit 22 may parse various inputs 19 to identify intent 23. CNLP unit 22 may provide intent 23 to server 28, which may invoke one or more of execution platforms 26, passing the intent 23 to the execution platforms 26 in the form of a pattern and associated entities, keywords, and the like. The invoked ones of execution platforms 26 may execute a process associated with intent 23 to perform an operation with respect to corresponding ones of databases 26 and thereby obtain result 25. The invoked ones of execution platforms 26 may provide result 25 (of performing the operation) to server 28, which may provide result 25, via interface 21, to client device 14 interfacing with host device 12 to enter input 19.

Associated with each pattern (examples of which were provided above) may be a function (i.e., a procedure) that can identify whether that pattern is to be exposed to the user at this point in the current user session. For instance, the "plot bubble_chart" pattern described in the third example above may be associated with a procedure that determines whether there is at least one dataset previously loaded by the user (possibly using the "load_data_from_file" pattern described in the first example above, or a "load_data_from_database" pattern that works similarly but loads data from a database instead of a file). When such a procedure is associated with every data visualization pattern in the system (such as "plot_histogram" and "plot_line_chart", etc.), the data visualization patterns may be conceptualized as forming a language sub-surface.

Because these patterns are only exposed when using one of the data loading patterns (which form another language sub-surface), the CNLP unit 22 may effectively link language sub-surfaces may be to each other. Because the user is only able to execute an utterance belonging to the data visualization language sub-surface after the above prerequisite has been met, the user is provided structure with regard to a so-called "thought process" in executing tasks of interest, allowing the user to (naturally) discover the capabilities of the system in a gradual manner, and reducing cognitive overhead during the discovery process.

As such, CNLP unit 22 may promote better operation of host device 12 that interfaces with user 16 according to a natural language interface, such as so-called "digital assistants" or "chatbots." Rather than consume processing cycles attempting to process ambiguous inputs from which multiple different meanings can be parsed, and presenting follow-up questions to ascertain the precise meaning the user intended by the input, CNLP unit 22 may result in more efficient processing of input 19 by limiting the available language to one or more sub-surfaces 18. The reduction in processing cycles may improve the operation of host device 12 as less power is consumed, less state is generated resulting in reduced memory consumption and less memory bandwidth is utilized (both of which also further reduce power consumption), and more processing bandwidth is preserved for other processes.

CNLP unit 22 may introduce different language sub-surfaces 18 through autocomplete, prompts, questions, or dynamic suggestion mechanisms, thereby exposing the user to additional language sub-surfaces in a more natural (or, in other words, conversational) way. The natural exploration that results through linked sub-surfaces may promotes user acceptability and natural learning of the language used by the CNLP techniques, which may avoid frustration due to frequent encounters with edge cases that generally appear due to user inexperience through inadequate understanding of the language by which the CNLP techniques operate. In this sense, the CNLP techniques may balance naturalness, precision and accuracy by naturally allowing a user to expose sub-surfaces utilizing a restricted unambiguous portion of the language to allow for precision and accuracy in expressing intents that avoid ambiguous edge cases.

For example, consider a chatbot designed to perform various categories of data analysis, including loading and cleaning data, slicing and dicing it to answer various business-relevant questions, visualizing data to recognize patterns, and using machine learning techniques to project trends into the future. Using the techniques described herein, the designers of such a system can specify a large language surface that allows users to express intents corresponding to these diverse tasks, while potentially constraining the utterances to only those that can be unambiguously understood by the system, thereby avoiding the edge-cases. Further, the language surface can be tailored to ensure that, using the auto-complete mechanism, even a novice user can focus on the specific task they want to perform, without being overwhelmed by all the other capabilities in the system. For instance, once the user starts to express their intent to plot a chart summarizing their data, the system can suggest the various chart formats from which the user can make their choice. Once the user selects the chart format (e.g., a line chart), the system can suggest the axes, colors and other options the user can configure.

The system designers can specify language sub-surfaces (e.g., utterances for data loading, for data visualization, and for machine learning), and the conditions under which they would be exposed to the user. For instance, the data visualization sub-surface may only be exposed once the user has loaded some data into the system, and the machine learning sub-surface may only be exposed once the user acknowledges that they are aware of the subtleties and pitfalls in building and interpreting machine learning models. That is, this process of gradually revealing details and complexity in the natural language utterances extends both across language sub-surfaces as well as within it.

Taken together, the CNLP techniques can be used to build systems with user interfaces that are easy-to-use (e.g., possibly requiring little training and limiting cognitive overhead), while potentially programmatically recognizing a large variety of intents with high precision, to support users with diverse needs and levels of sophistication. As such, these techniques may permit novel system designs achieving a balance of capability and usability that is difficult or even impossible otherwise.

Figure 2:
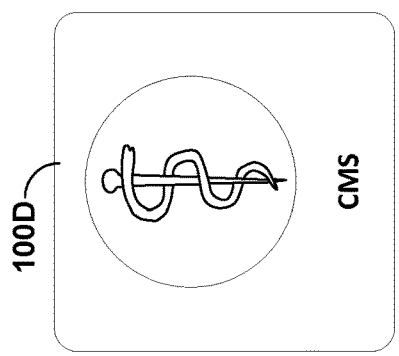
FIG. 2 is a diagram illustrating an example interface presented by the interface unit of the host device shown in FIG. 1 that includes a number of different applications executed by the execution platforms of the host device.
Figure 2:
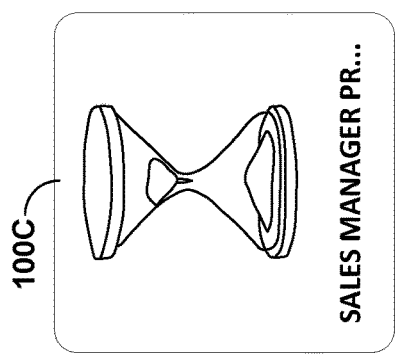
Figure 2:
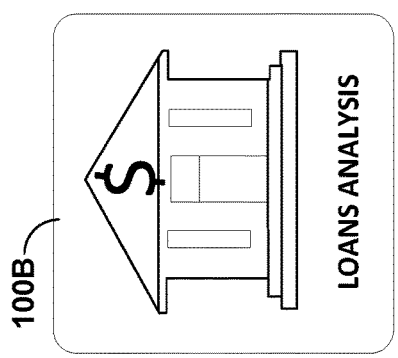
Figure 2:
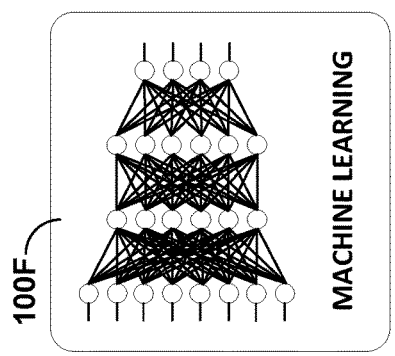
Figure 2:
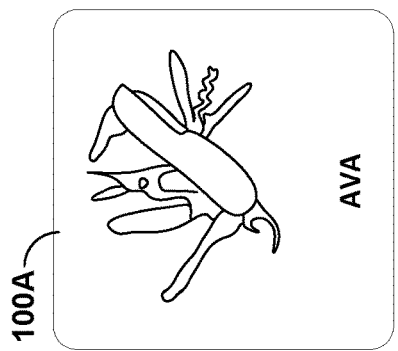
Figure 2:
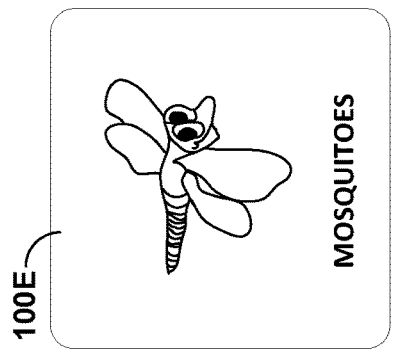

FIG. 2 is a diagram illustrating an example interface 21A presented by interface unit 20 of host device 12 that includes a number of different applications 100A-100F executed by execution platforms 26. Application 100A represent a general chatbot interface for performing data analytics with respect to one or more of databases 26. Application 100B represents a loan analysis application for analyzing loan data stored to one or more of databases 26. Application 100C represents a sales manager productivity application for analyzing sales manager productivity data stored to one or more of databases 26. Application 100D represents a medical cost analysis application for analyzing medical cost data stored to one or more of databases 26. Application 100E represents a scientific data analysis application for analyzing experimental data regarding prevalence of different mosquito species, collected by a scientific research group and stored to one or more of databases 26. Application 100F represents a machine learning application for performing machine learning with respect to data stored to one or more of databases 26.

Figure 3A:
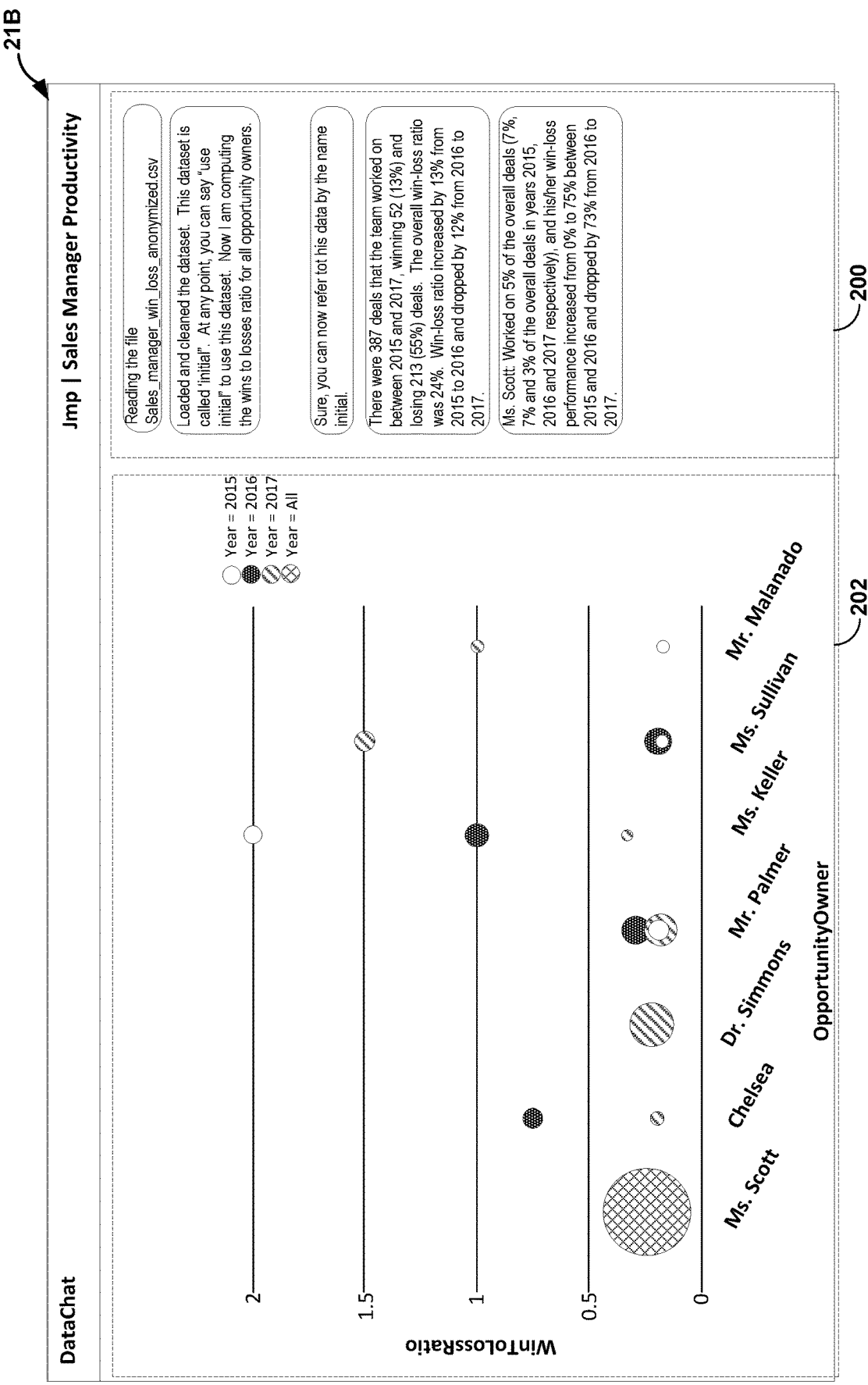

FIGS. 3A-3H are diagrams illustrating interfaces 21B-21H presented by interface unit 20 of host device 12 that facilitate sales manager productivity analytics via sales manager productivity application 100C shown in FIG. 2 in accordance with various aspects of the CNLP techniques described in this disclosure. In the example of FIG. 3A, interface 21B includes a text presentation portion 200 by which to display dialog, and a results presentation portion 202 that presents results 25. Text presentation portion 200 may, although now shown in FIG. 3A, include a text entry field with which user 16 may interact to enter inputs 19. Result presentation portion 202 presents results 25 that are responsive to identifying an intent associated with the 'PLOT a BUBBLE CHART' pattern. That is, result presentation portion 202 presents a bubble chart showing win-to-loss ratios for opportunity owners in the context of the sales manager productive application 100C shown in FIG. 2.

Figure 3B:
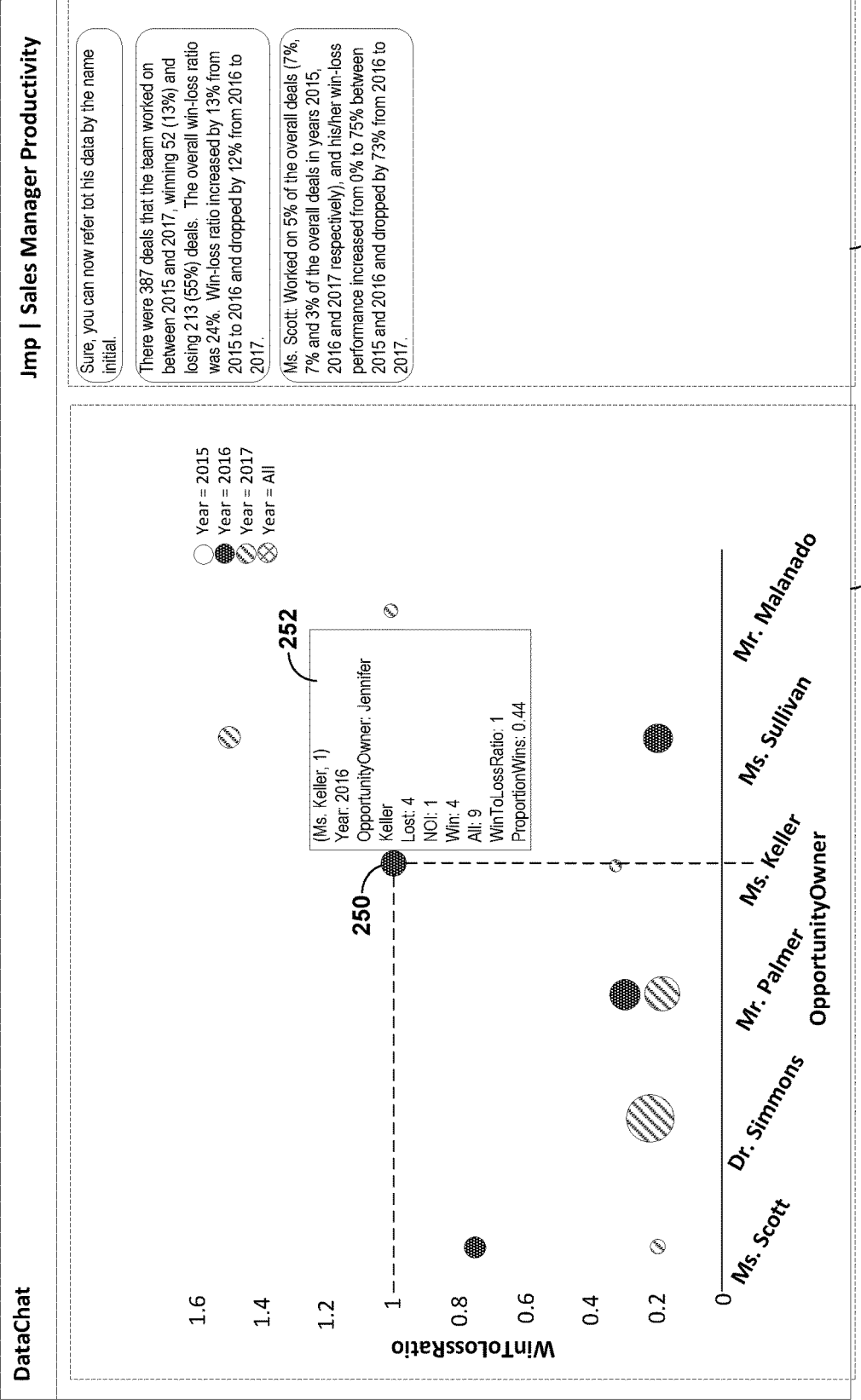

In the example of FIG. 3B, interface unit 20 has presented interface 21C responsive to user 16 selecting bubble 250 in the bubble chart shown in the result presentation portion 202 shown in interface 21B of FIG. 3A. Responsive to selecting bubble 250, server 28 may interface with a corresponding execution platform 26 to obtain results 25 associated with opportunity owner identified as "Jennifer Keller." Interface unit 20 may generate or otherwise obtain interface 21C to include win-to-loss metrics element 252, providing interface 21C to user 16 via client 30.

Figure 3C:
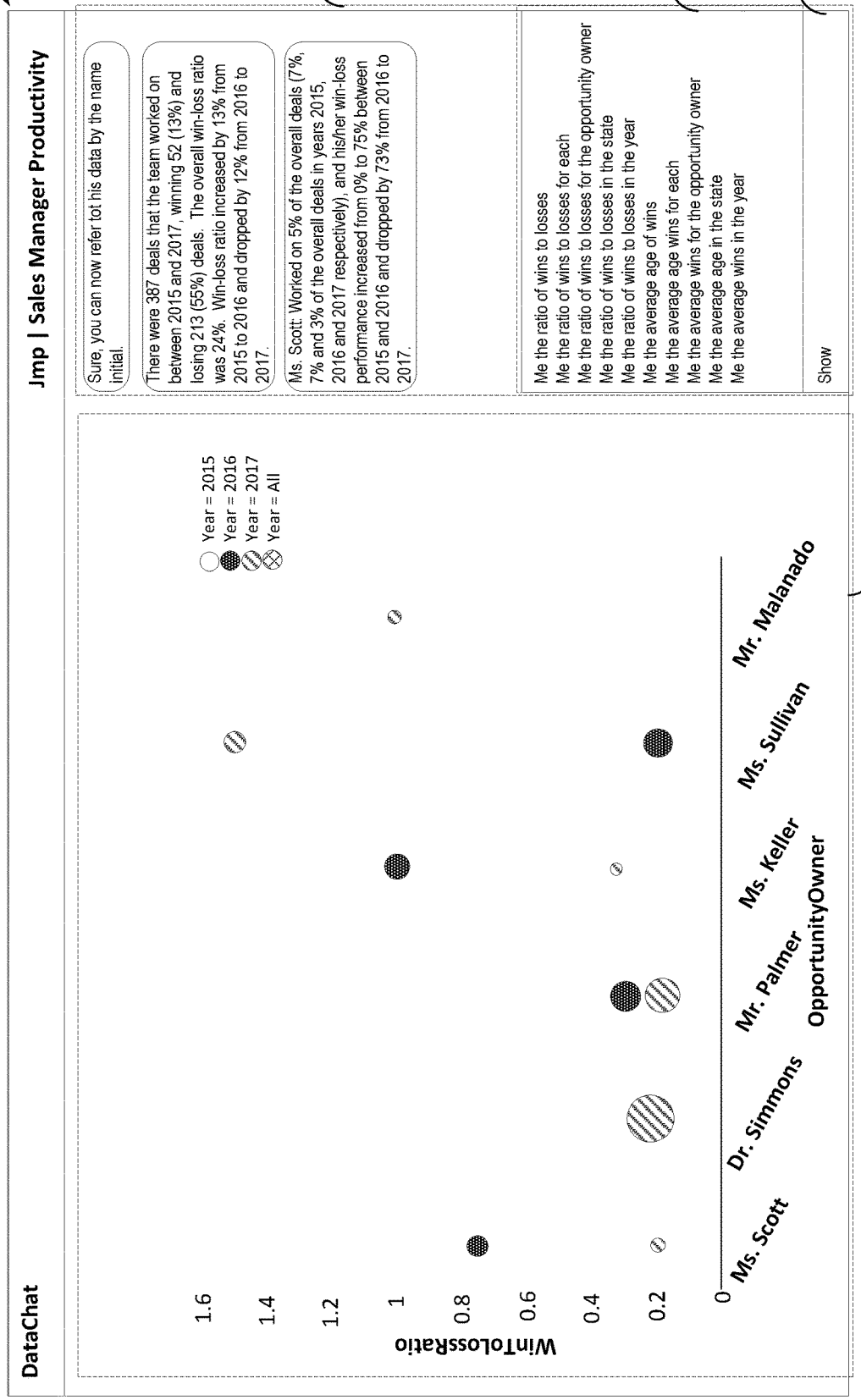

In the example of FIG. 3C, interface unit 20 has presented interface 21D responsive to user 16 entering input 19 as text "Show" in text entry field 300 of text presentation portion 200. Server 28 may receive input 19 and analyze input 19 to automatically perform an autocomplete operation to expose one of language sub-surfaces 18 denoted by autocomplete entries shown in autocomplete presentation field 302 overlaid over text presentation field 200. Although not shown in the example of FIG. 3C, server 28 may also provide suggestions to expose the one of the language sub-surfaces 28, where suggestions may differ from autocomplete entries in that user 16 has not provided any input 19 by which to base the presentation of the autocomplete entries (where suggestions may expose the entire portion of the language corresponding to the exposed one of the language sub-surfaces, while autocomplete entries may only show a subset of the portion of the language associated or matched to input 19).

In the example of FIG. 3D, interface unit 20 has presented interface 21E responsive to user 16 entering input 19 specifying "Show me the ratio of wins to losses for each state" as shown in recorded dialog field 350. Responsive to entering input 19 specifying "Show me the ratio of wins to losses for each state," server 28 may interface with a corresponding execution platform 26 to obtain results 25 presented as table 352 in result presentation field 202. Interface unit 20 may generate or otherwise obtain interface 21E to include table 352, providing interface 21E to user 16 via client 30.

In the example of FIG. 3E, interface unit 20 has presented interface 21F responsive to user 16 entering input 19 specifying "Show me the ratio of wins to losses in the year 2017" as shown in recorded dialog field 500. Responsive to entering input 19 specifying "Show me the ratio of wins to losses in the year 2017," server 28 may interface with a corresponding execution platform 26 to obtain results 25 presented as table 502 in result presentation field 202. Interface unit 20 may generate or otherwise obtain interface 21F to include table 502, providing interface 21F to user 16 via client 30.

Figure 3F:
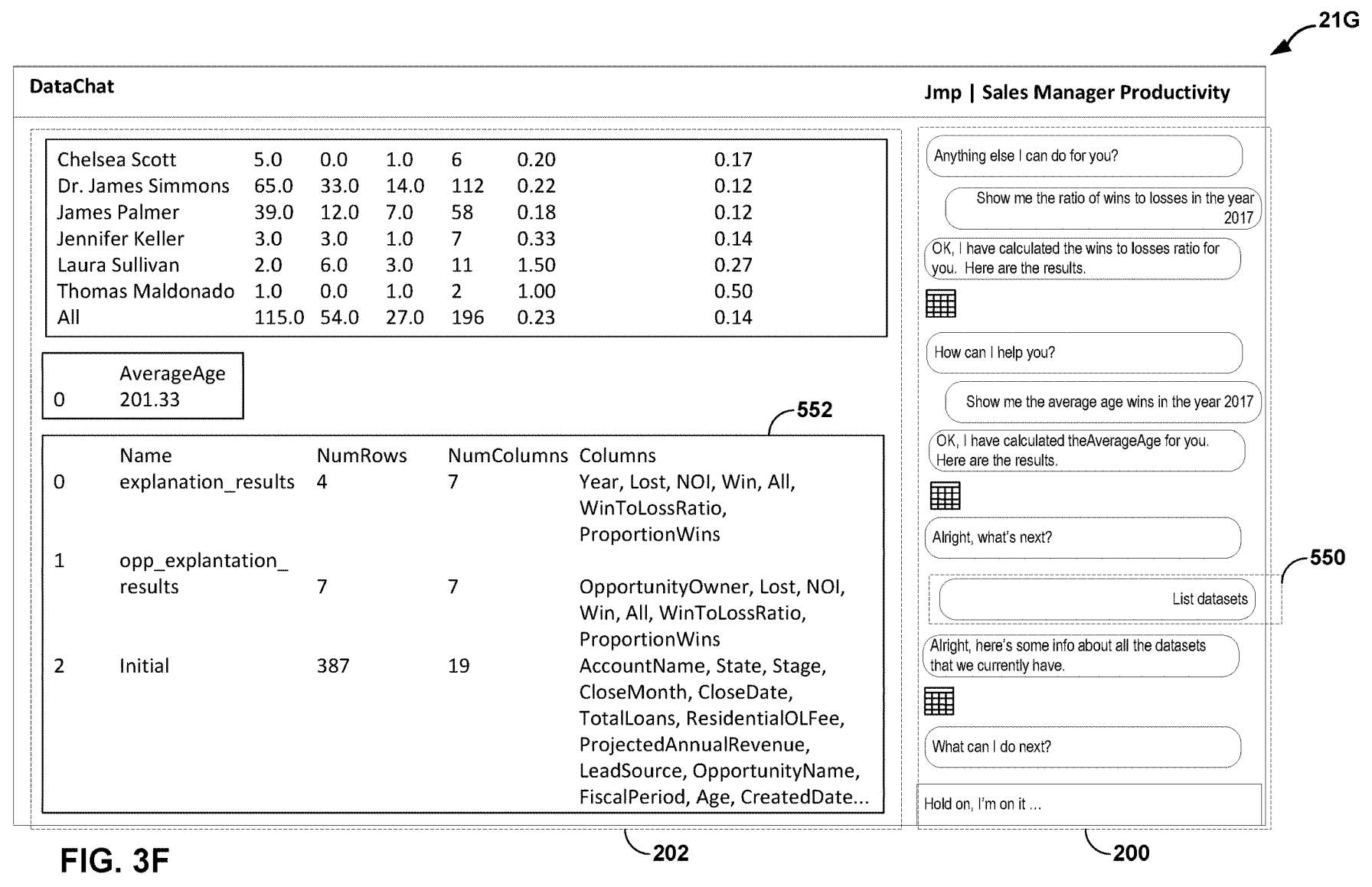

In the example of FIG. 3F, interface unit 20 has presented interface 21G responsive to user 16 entering input 19 specifying "list all datasets" as shown in recorded dialog field 500. Responsive to entering input 19 specifying "list all datasets," server 28 may interface with a corresponding execution platform 26 to obtain results 25 presented as table 552 in result presentation field 202, which lists all of the datasets stored to the corresponding one of databases 26. Interface unit 20 may generate or otherwise obtain interface 21G to include table 552, providing interface 21G to user 16 via client 30.

Figure 3G:
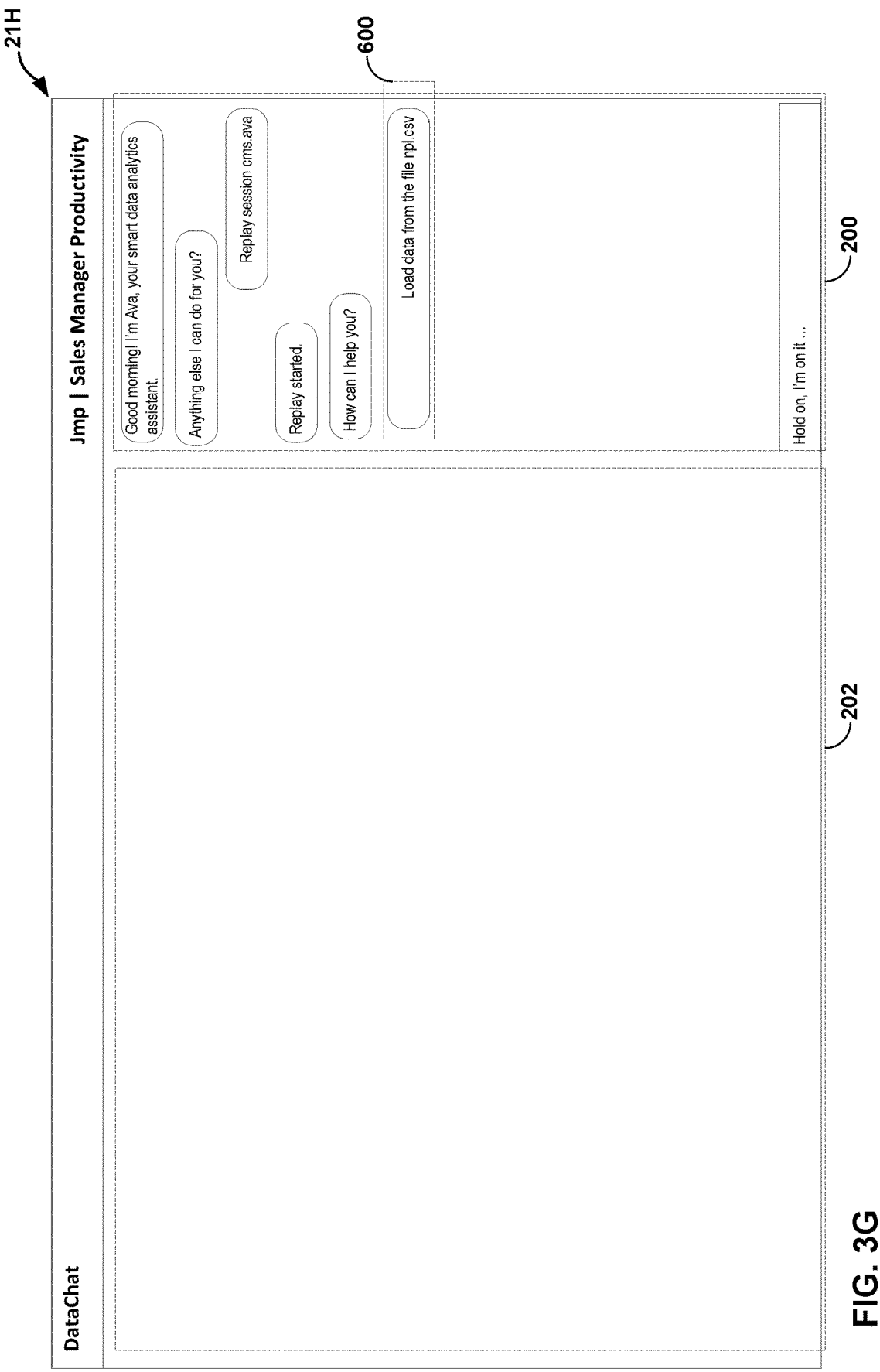

In the example of FIG. 3G, interface unit 20 has presented interface 21H responsive to user 16 entering input 19 specifying "load data from the file npi.csv" as shown in recorded dialog field 600, which corresponds to the load filename pattern discussed above in more detail.

In the example of FIG. 3H, interface unit 20 has presented interface 21H responsive to user 16 entering input 19 specifying "S" as shown in text entry field 300. Responsive to entering input 19 specifying "S," server 28 provide suggestions in suggestion presentation field 650 to expose the one of the language sub-surfaces 28 and allow user 28 to better understand the exposed one of the language sub-surfaces 28 and thereby learn more patterns.

Taken in sequence, FIG. 3H and FIG. 3C show how the design of the language surfaces is coupled with the auto-complete mechanism to potentially limit cognitive overhead for the user. All patterns in the system illustrated in FIGS. 3H and 3C begin with an identifier. The identifiers may be reused judiciously between the patterns so as to group the identifiers together meaningfully related language sub-surfaces.

For instance, all the data visualization patterns begin with the identifier "Plot." As shown FIG. 3H, when beginning a new utterance, the user is only presenting the various starting identifiers in the patterns. As such, even though there are many different data visualization patterns (corresponding to different chart formats) supported by the system, only a single "Plot" identifier may be shown in the auto-complete suggestions list, subsuming all of these patterns. Since the user in FIG. 3H has chosen to specify "S" as shown in the text entry field 300, the displayed list 650 excludes the "Plot" identifier (since the word "Plot" does not contain the letter "S"), thereby filtering out all the data visualization patterns. Absent the CNLP mechanisms described herein, the user might have had to deal with a dozen or more data visualization patterns in this example, alongside the many other patterns such as "list all datasets" and "show win loss ratio" shown here.

As a next step, once the user has entered the word "Show" (or selected it from the list 650 in FIG. 3H), the interface switches to that shown in FIG. 3C, with the list 302 containing only the various patterns beginning with the identifier "Show". In particular, this list includes utterances that correspond to the patterns "show win loss ratio" and "show average age".

In the context of the discovery process outlined above, the utterances corresponding to the group of data visualization patterns beginning with the identifier "Plot" may be thought to belong to a language sub-surface that is contained in a hierarchy of all utterances. The specialized subset of utterances corresponding to the "plot bubble_chart" pattern is also present within this hierarchy, placed below (i.e., contained within) the data visualization language sub-surface. In this way, the structure of the language surface, using the formulation of identifiers and entities, naturally arranges the large set of all utterances recognizable by the system into a multi-level hierarchy. In combination with the auto-complete mechanism, this hierarchy of utterances (or language sub-surfaces) lends itself to a structured discovery process where the user is only forced to deal with a small number of options (in the form of a dynamic suggestions list) at any time, descending this hierarchy one step at a time, thereby enhancing system usability.

Figure 4:
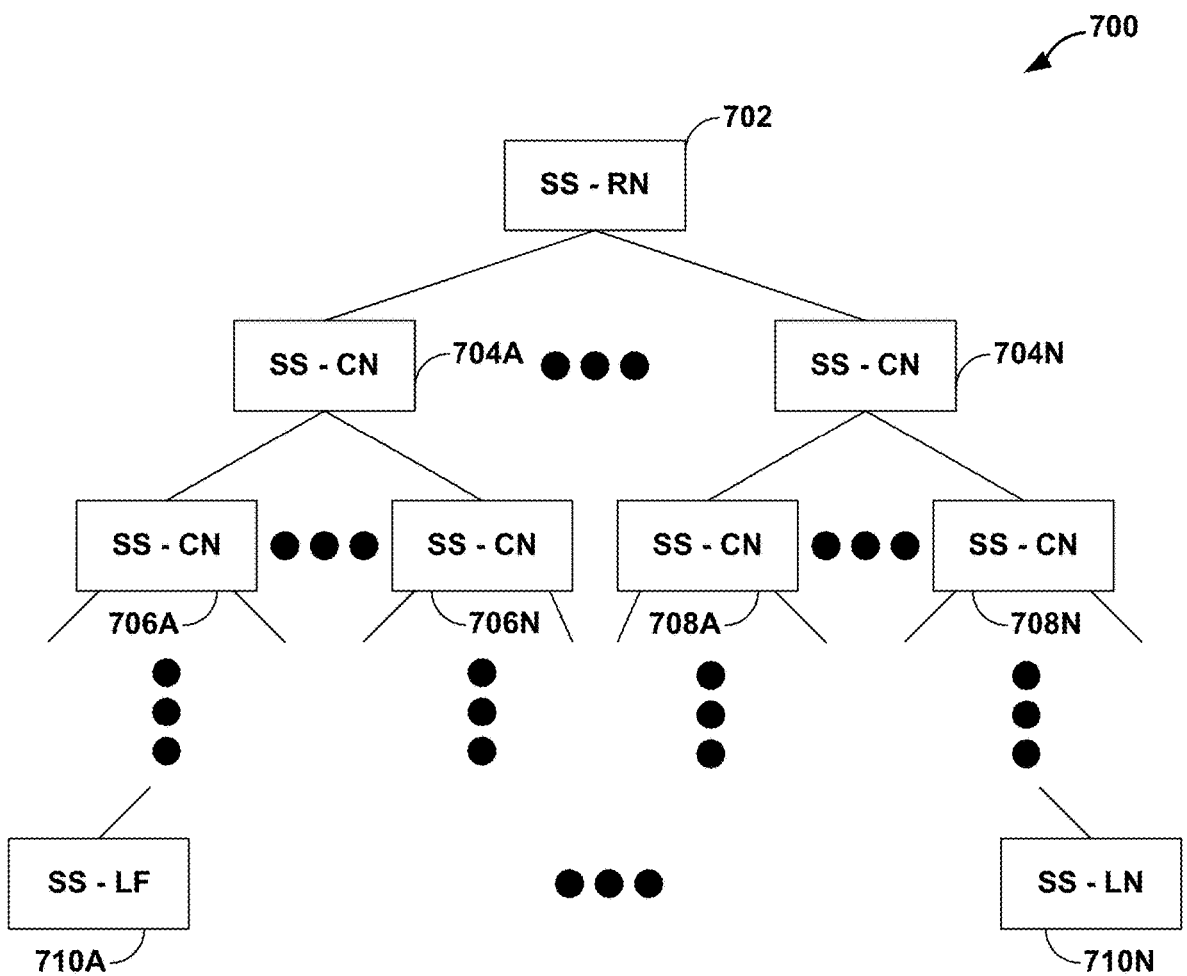
FIG. 4 is a block diagram illustrating a data structure used to represent the language surface shown in the example of FIG. 1 in accordance with various aspects of the techniques described in this disclosure.

FIG. 4 is a block diagram illustrating a data structure 700 used to represent the language surface 18 shown in the example of FIG. 1 in accordance with various aspects of the techniques described in this disclosure. As shown in the example of FIG. 4, the data structure 700 may include a sub-surface root node 702 ("SS-RN 702"), a number of hierarchically arranged sub-surface child nodes 704A-704N ("SS-CNs 704"), 706A-706N ("SS-CNs 706"), 708A-708N ("SS-CNs 708"), and sub-surface leaf nodes 710A-710N ("SS-LNs 710").

Sub-surface root node 702 may represent an initial starting node that exposes a basic sub-surface, thereby constraining exposure to the sub-surfaces dependent therefrom, such as SS-RNs 704. Initially, CNLP unit 22, for a new user 16, may only expose a limited set of patterns, each of which, as noted above, include identifiers, positional and keyword entities and ignored words. CNLP unit 22 may traverse from SS-RN 702 to one of SS-CNs 407 based on a context (which may refer to one of or a combination of a history of the current session, identified user capabilities, user preferences, etc.). As such, CNLP unit 22 may traverse hierarchically arranged nodes 702-710 (e.g., from SS-RN 702 to one of SS-CNs 704 to one of SS-CNs 706/708 to one of SS-LFs 710) in order to balance discoverability with cognitive overhead.

As described above, all of the patterns in the language surface may begin with an identifier, and the these identifiers are reused across patterns to group them into language sub-surfaces 702-710. For example, all the data visualization intents begin with "Plot." When beginning to enter an utterance in the text box, user 16 may view an auto-complete suggestions list containing one the first identifiers (like "Plot", "Load" etc.). Once user 16 completes the first identifier, CNLP unit 22 may only expose other patterns belonging to that language sub-surface as further completions. In the above example, only when user 16 specifies "Plot" as the first word, does CNLP unit 16 invoke the auto-complete mechanism to propose various chart formats (such as line chart, bubble chart, histogram, etc.). Responsive to user 16 specifying one of the autocomplete suggestion (e.g., line chart), CNLP unit 16 may expose the entities that user 16 would need to specify to configure the chart (like the columns on the axes, colors, sliders, etc.).

Conceptually, the set of all utterances (the language surface) may be considered as being decomposed into subsets (sub-surfaces) which are arranged hierarchically (based on the identifiers and entities in the utterances), where each level of the hierarchy contains all the utterances/patterns that form the underlying subsets. Using the autocomplete mechanism, user 16 navigates this hierarchy top-to-bottom, one step at a time. At each step, user 16 may only be shown a small set of next-steps as suggestions. This allows CNLP unit 22 to balance discoverability with cognitive overhead. In other words, this aspect of the techniques may be about how to structure the patterns using the pattern specification language: the design choices here (like "patterns begin with identifiers") are not imposed by the pattern specification language itself.

Additionally, certain language sub-surfaces are exposed only when corresponding conditions are met. For example, CNLP unit 22 may only expose the data visualization sub-surface when there is at least one dataset already loaded. This is achieved by associating each pattern with a function/procedure that looks at the current context (the history of this session, the capabilities and preferences of the user, etc.) to decide whether that pattern is exposed at the current time.

Figure 5:
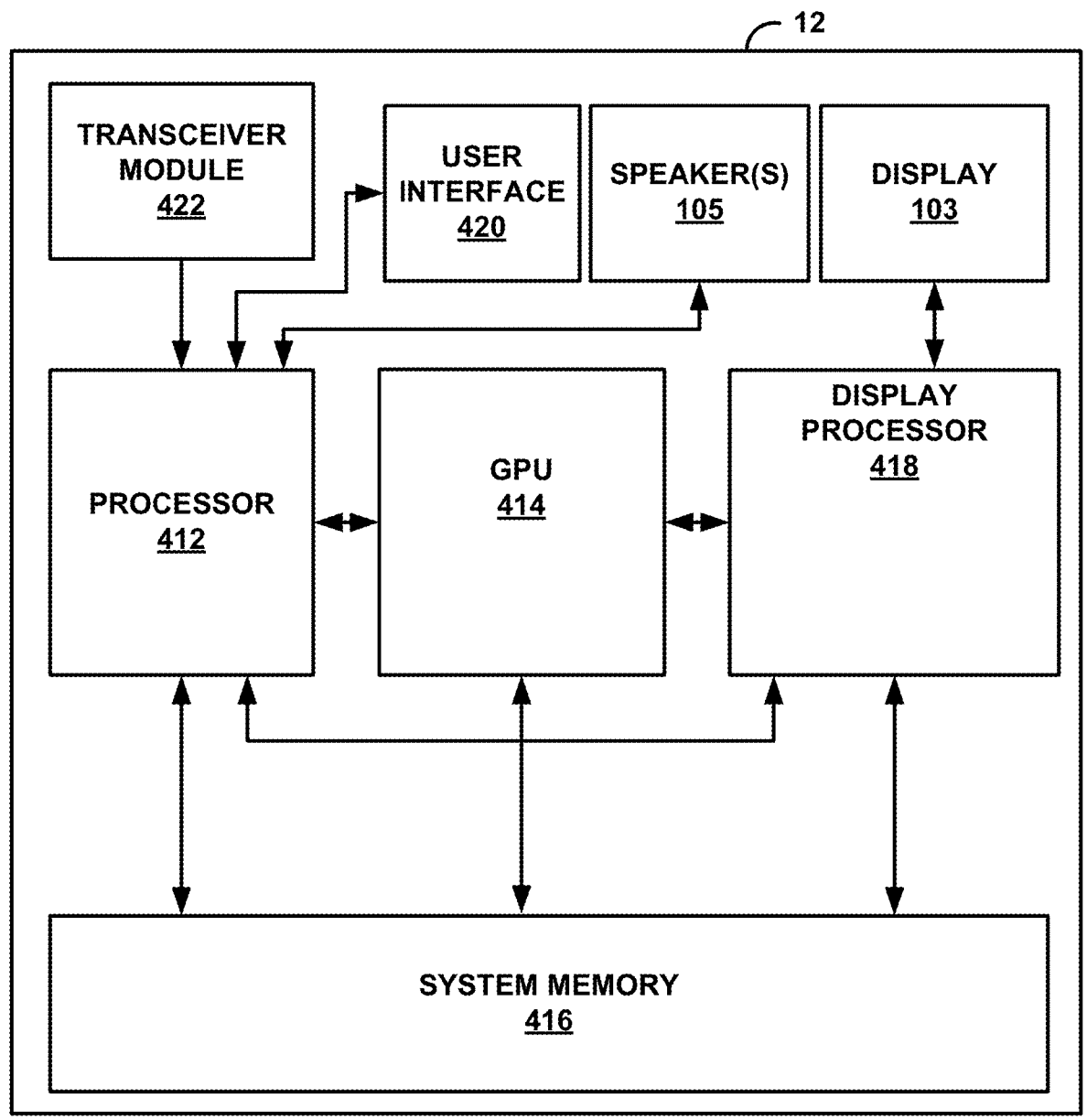
FIG. 5 is a block diagram illustrating example components of the devices shown in the example of FIG. 1.

FIG. 5 is a block diagram illustrating example components of the host device 12 and/or the client device 14 shown in the example of FIG. 1. In the example of FIG. 4, the device 12/14 includes a processor 412, a graphics processing unit (GPU) 414, system memory 416, a display processor 418, one or more integrated speakers 105, a display 103, a user interface 420, and a transceiver module 422. In examples where the source device 12 is a mobile device, the display processor 418 is a mobile display processor (MDP). In some examples, such as examples where the source device 12 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the source device 12. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications 20. Examples of the applications 20 include web browsers, e-mail applications, spreadsheets, video games, other applications that generate viewable objects for display, or any of the application types listed in more detail above. The system memory 416 may store instructions for execution of the applications 20. The execution of one of the applications 20 on the processor 412 causes the processor 412 to produce graphics data for image content that is to be displayed and the audio data 21 that is to be played. The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any technique for communication.

The system memory 416 may be the memory for the source device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12 and moved to another device. As another example, memory, substantially similar to the system memory 416, may be inserted into the devices 12/14. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to one or more of the various units/modules/etc. The transceiver module 422 may represent a unit configured to establish and maintain the wireless connection between the devices 12/14. The transceiver module 422 may represent one or more receivers and one or more transmitters capable of wireless communication in accordance with one or more wireless communication protocols.

In each of the various instances described above, it should be understood that the devices 12/14 may perform a method or otherwise comprise means to perform each step of the method for which the devices 12/14 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the devices 12/14 has been configured to perform.

Figure 6:
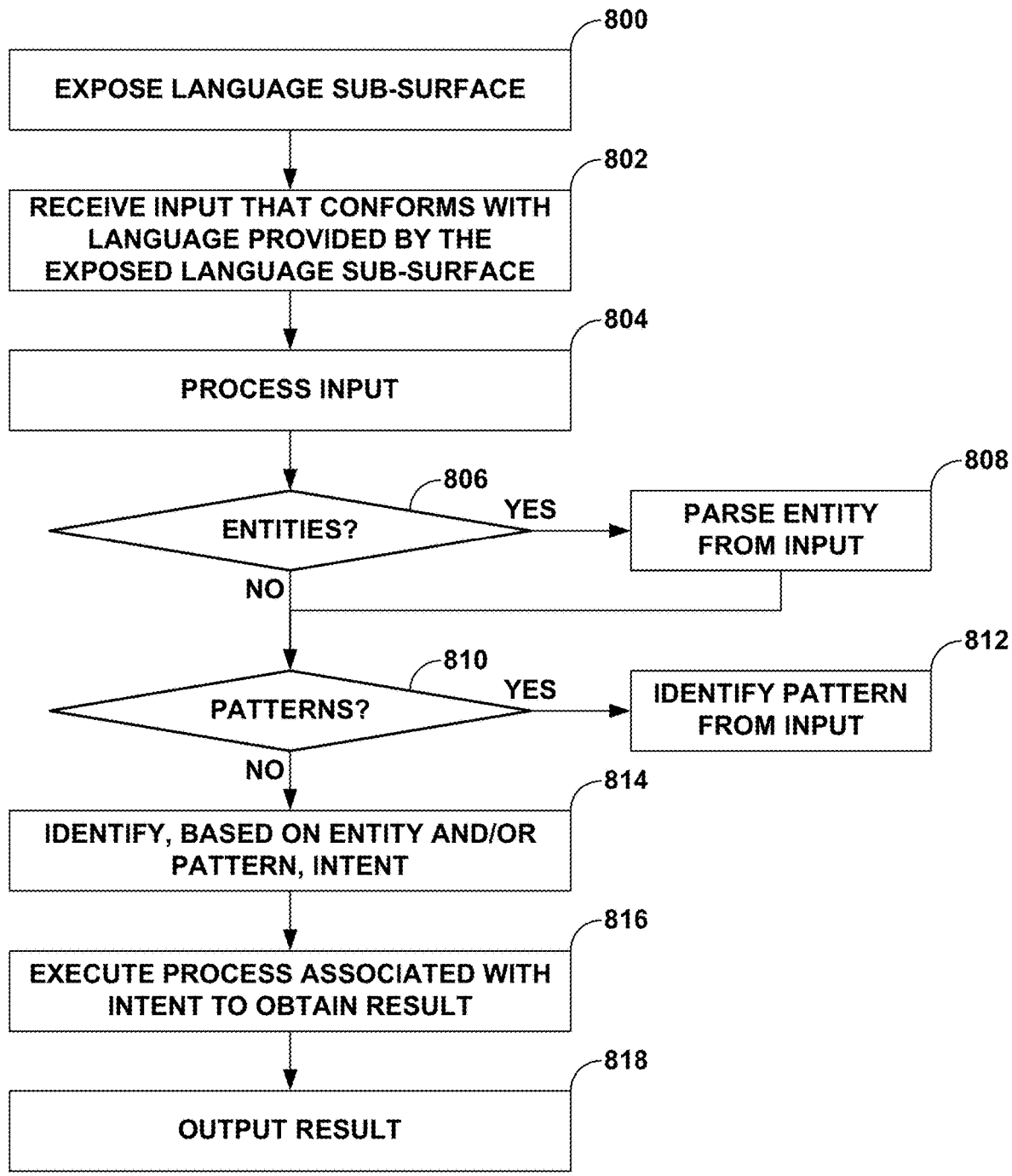
FIG. 6 is a flowchart illustrating example operation of the host device of FIG. 1 in performing various aspects of the techniques described in this disclosure.

FIG. 6 is a flowchart illustrating example operation of the host device of FIG. 1 in performing various aspects of the techniques described in this disclosure. As described above, CNLP unit 22 may expose, to an initial user (which user 16 may be assumed to be for purposes of illustration) a select one of language sub-surfaces 18 in a constrained manner, potentially only exposing the select one of the language sub-surfaces 18. As such, CNLP unit 22 may expose a language sub-surface specifying a natural language containment hierarchy defining a grammar for a natural language as a hierarchical arrangement of a plurality of language sub-surfaces 18 (800).

CNLP unit 22 may receive, via interface unit 20, input 19 that conforms with the portion of the language provided by the exposed language sub-surface (802), and process input 19 to identify intent 23 of user 16 from a plurality of intents 23 associated with the language (804). That is, when designing CNLP unit 22 in support of server 28, a designer may select a set of intents 23 that the server 28 supports (in terms of supporting parsing of input 19 via CNLP unit 22).

Further, CNLP unit 22 may optionally increase precision with respect to each of intents 23 by supporting one or more entities, as described above. CNLP unit 22 may perform the process of parsing to identify that utterance 19 belongs to a certain one of the set of intents 23, and thereafter to extract any entities that may have occurred in the utterance 19. In other words, CNLP unit 22 may determine whether there are any entities (806). When CNLP unit 22 identifies that the input includes one or more entities ("YES" 806), CNLP unit 22 may parse the entity from the input (808).

After either parsing the entity from the input or when there are no entities ("NO" 806), CNLP unit 22 may determine whether the input includes any patterns (810). When CNLP unit 22 identifies the patterns ("YES" 810), CNLP unit 22 may identify the pattern from the input (812). That is, CNLP unit 22 may associate each of intents 23 provided by the language 18 with one or more patterns. As such, CNLP unit 22 may process input 19 to identify a pattern from a plurality of patterns associated with the language 18, each of the plurality of patterns associated with a different one of the plurality of intents 23. CNLP unit 22 may then identify, based on the identified entity and/or pattern, intent 23 of user 16 from the plurality of intents associated with the portion of the language (814).

In this way, CNLP unit 22 may parse various inputs 19 to identify intent 23. CNLP unit 22 may provide intent 23 to server 28, which may invoke one or more of execution platforms 26, passing the intent 23 to the execution platforms 26 in the form of a pattern and associated entities, keywords, and the like. The invoked ones of execution platforms 26 may execute a process associated with intent 23 to perform an operation with respect to corresponding ones of databases 26 and thereby obtain result 25 (816). The invoked ones of execution platforms 26 may output result 25 (818) (e.g., provide result 25 to server 28, which may provide result 25, via interface 21, to client device 14 interfacing with host device 12 to enter input 19).

In this respect, various aspects of the techniques are directed to the following:

1. A constrained natural language framework that describes patterns that may be parsed without much if any ambiguity by an algorithm (executed by a computing device, such as that shown above in FIG. 4). The parsing may include both categorization of user intent 23 as well as extraction of associated entities that might be present in the utterance 19.

2. A parser generator algorithm (executed by a computing device, such as that shown above in FIG. 4) that synthesizes an intent recognizer and entity extractor based on one or more patterns in the framework above.

3. A mechanism to elicit user responses containing the values of entities that are required by the server 28 for intent processing but which are not included in the user's utterance 19.

4. A verification algorithm (executed by a computing device, such as that shown above in FIG. 4) that ensures that entities that are extracted from an utterance 19 are meaningful in some way. For instance, the timing in the above meeting-scheduler example may be "5 pm" or "noon", but not "Wisconsin".

5. A static checking algorithm (executed by a computing device, such as that shown above in FIG. 4) that ensures that patterns associated with different intents 19 do not conflict with each other by choosing the same set of intents 23. Such an algorithm ensures that utterances 19 are always parsed unambiguously.

6. A mechanism to automatically generate or augment the list of synonyms based on a machine-readable dictionary or thesaurus such as WordNet™.

7. An autocomplete mechanism to propose or recommend completions for partial utterances 19 that the user may provide in a text-based user interface. The autocomplete mechanism may rank completions based on a purely syntactic ranking (based only on similarity of the partial utterance 19 to potential completions based on the patterns) or a statistical ranking scheme (based on usage frequency of what intents users use often, and in what order) or any combination thereof.

8. A discovery mechanism that allows user 16 to obtain from the server 28 a list of intents 23 and patterns the list of intents 23 supports, optionally filtering the list to only those entries that are related to certain search terms that user 16 may choose.

9. A discovery mechanism that allows user 16 to obtain from the server 28 a list of entities that are associated with an intent 23 and how such entities may be included in an utterance 19.

10. An ambiguity resolver mechanism that allows the server 28 designer/developer to include bespoke handlers that handle utterances 19 where the user's utterance 19 is unclear (ambiguous) about the intent 23, possibly due to the occurrence of only a subset of identifiers that are common to multiple patterns.

11. A mechanism to maintain a conversational context (including, but not limited to, a history of utterances 19 made by the user previously in this and possibly other sessions), and to infer values for entities based on the context. For instance, after making a statement "Send an email to John . . . ", a user may say the utterance "schedule an appointment with him". The parser (e.g., CNLP unit 22) would then infer that John is an intended participant in the meeting.

12. A mechanism to allow advanced patterns that translate/rewrite a given utterance 19 into a phrasing that is capable of being parsed by another pattern. For instance, an advanced pattern may translate utterances 19 of the form "I would like to set up an appointment" to the utterance "schedule an appointment", which can then be parsed using the meeting-scheduler pattern in our example above. Such advanced patterns can be used to systematically improve the naturalness of user utterances 19 that CNLP unit 22 may parse correctly.

13. A mechanism to augment the constrained natural language framework with other approaches (including traditional keyword-based or machine learning-based methods, as well as other methods based on heuristics), in order to handle utterances 19 that are, completely or in part, unable to be handled by CNLP unit 22. For instance, a deep neural network-based parser may be trained to parse utterances 19 that are parsed as belonging to the meeting-scheduler intent based on patterns, but whose entities CNLP unit 22 is incapable of extracting correctly.

14. A mechanism to allow certain subsets of patterns (forming a language sub-surface) to only be recognized by the pattern parsers of CNLP unit 22 when uncovered by certain previous patterns. For instance, a "schedule meeting" pattern as described above may uncover other patterns such as "change frequency" or "email attendees". This "uncovering" means that the latter set of patterns can only be uttered by the user (and recognized by the parsers) after the user triggers it with an utterance 19 associated with the "schedule meeting" pattern. (In other words, user 16 must first schedule a meeting before they can change its frequency or email its attendees.) Such a mechanism can also be used to support users with different levels of expertise/sophistication: more advanced users may unlock patterns that only a sophisticated user is capable of using correctly.

Furthermore, various aspects of the techniques may be represented by the clauses listed below.

Clause 1A. A device configured to process data indicative of an input, the device comprising: one or more processors configured to: expose a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input; receive the data indicative of the input that conforms with the portion of the language provided by the exposed language sub-surface; process the data indicative of the input to identify an intent of the user from a plurality of intents associated with the portion of the language; and execute a process associated with the identified intent to perform an operation; and a memory configured to store the data indicative of the input.

Clause 2A. The device of clause 1A, wherein the one or more processors are configured to expose only the language sub-surface of the plurality of language sub-surfaces.

Clause 3A. The device of any combination of clauses 1A-2A, wherein the one or more processors are further configured to: determine that the user is able to successfully invoke the plurality of intents associated with the portion of the language within a threshold, and expose, responsive to determining that the user is able to successfully invoke the plurality of intents, a second language sub-surface of the plurality of language sub-surfaces, the second language sub-surface providing a second portion of the language with which a user may interface to enter second data indicative of a second input; receive the second data indicative of the second input that conforms with the second portion of the language provided by the exposed second language sub-surface; process the second data indicative of the second input to identify a second intent of the user from a second plurality of intents associated with the second portion of the language; and execute a second process associated with the identified second intent to perform a second operation.

Clause 4A. The device of any combination of clauses 1A-3A, wherein the one or more processors are further configured to present an interface that includes a text entry field that automatically provides one or more suggestions to expose the language sub-surface.

Clause 5A. The device of any combination of clauses 1A-4A, wherein the one or more processors are further configured to present an interface that includes a text entry field that automatically performs an autocomplete operation to expose the language sub-surface.

Clause 6A. The device of any combination of clauses 1A-5A, wherein the language sub-surface comprises a first language sub-surface, wherein the first language sub-surface specifies a transition to a second language sub-surface of the plurality of language sub-surfaces, and wherein the one or more processors are further configured to expose, responsive to second data from the user identifying the transition, the second language sub-surface of the plurality of language sub-surfaces, the second language sub-surface providing a second portion of the language with which a user may interface to enter second data indicative of a second input.

Clause 7A. The device of clause 6A, wherein the one or more processors are further configured to present an interface that includes a text entry field that automatically performs an autocomplete operation facilitate entry of the data identifying the transition.

Clause 8A. The device of clause 6A, wherein the one or more processors are further configured to: receive the second data indicative of the second input that conforms with the second portion of the language provided by the exposed second language sub-surface; process the second data indicative of the second input to identify a second intent of the user from a second plurality of intents associated with the second portion of the language; and execute a second process associated with the identified second intent to perform a second operation.

Clause 9A. The device of any combination of clauses 1A-8A, wherein the one or more processors are configured to: process the data indicative of the input to identify a pattern from a plurality of patterns associated with the language, each of the plurality of patterns associated with a different one of the plurality of intents; and identify, based on the identified pattern, the intent of the user from the plurality of intents associated with the portion of the language.

Clause 10A. The device of clause 9A, wherein the pattern includes an identifier, and wherein the one or more processors are configured to: parse the data indicative of the input to identify the identifier; and identify, based on the identifier, the pattern.

Clause 11A. The device of clause 10A, wherein the pattern includes both the identifier and a position entity, and wherein the one or more processors are configured to: parse the data indicative of the input to identify the positional entity; and identify, based on the identifier and the positional identity, the pattern.

Clause 12A. The device of any combination of clauses 9A-11A, wherein the pattern includes a keyword, and wherein the one or more processors are configured to: parse the data indicative of the input to identify the keyword; and identify, based on the keyword, the pattern.

Clause 13A. The device of any combination of clauses 9A-12A, wherein the pattern includes an entity, and wherein the one or more processors are configured to: determine that the data indicative of the input corresponds to the pattern but does not include the entity; and output, based on the determination that the data indicative of the input corresponds to the pattern but does not include the entity, a prompt requesting data indicative of additional input specifying the entity.

Clause 14A. The device of clause 13A, wherein the one or more processors are configured to: receive the data indicative of the additional input specifying the entity; and identify, based on the data indicative of the input and the data indicative of the additional input, the pattern.

Clause 15A. The device of any combination of clauses 1A-14A, wherein the one or more processors are further configured to: obtain a result of performing the operation; and provide the result, via an interface, to a client interfacing with the device to enter the data indicative of the input.

Clause 16A. A method of processing data indicative of an input, the method comprising: exposing a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input; receiving the data indicative of the input that conforms with the portion of the language provided by the exposed language sub-surface; processing the data indicative of the input to identify an intent of the user from a plurality of intents associated with the portion of the language; and executing a process associated with the identified intent to perform an operation.

Clause 17A. The method of clause 16A, wherein exposing the language sub-surface comprises exposing only the language sub-surface of the plurality of language sub-surfaces.

Clause 18A. The method of any combination of clauses 16A-17A, further comprising: determining that the user is able to successfully invoke the plurality of intents associated with the portion of the language within a threshold, and exposing, responsive to determining that the user is able to successfully invoke the plurality of intents, a second language sub-surface of the plurality of language sub-surfaces, the second language sub-surface providing a second portion of the language with which a user may interface to enter second data indicative of a second input; receiving the second data indicative of the second input that conforms with the second portion of the language provided by the exposed second language sub-surface; processing the second data indicative of the second input to identify a second intent of the user from a second plurality of intents associated with the second portion of the language; and executing a second process associated with the identified second intent to perform a second operation.

Clause 19A. The method of any combination of clauses 16A-18A, further comprising presenting an interface that includes a text entry field that automatically provides one or more suggestions to expose the language sub-surface.

Clause 20A. The method of any combination of clauses 16A-19A, further comprising presenting an interface that includes a text entry field that automatically performs an autocomplete operation to expose the language sub-surface.

Clause 21A. The method of any combination of clauses 16A-20A, wherein the language sub-surface comprises a first language sub-surface, wherein the first language sub-surface specifies a transition to a second language sub-surface of the plurality of language sub-surfaces, and wherein the method further comprises exposing, responsive to second data from the user identifying the transition, the second language sub-surface of the plurality of language sub-surfaces, the second language sub-surface providing a second portion of the language with which a user may interface to enter second data indicative of a second input.

Clause 22A. The method of clause 21A, further comprising presenting an interface that includes a text entry field that automatically performs an autocomplete operation facilitate entry of the data identifying the transition.

Clause 23A. The method of clause 21A, further comprising: receiving the second data indicative of the second input that conforms with the second portion of the language provided by the exposed second language sub-surface; processing the second data indicative of the second input to identify a second intent of the user from a second plurality of intents associated with the second portion of the language; and executing a second process associated with the identified second intent to perform a second operation.

Clause 24A. The method of any combination of clauses 16A-23A, wherein processing the data indicative of the input comprises: processing the data indicative of the input to identify a pattern from a plurality of patterns associated with the language, each of the plurality of patterns associated with a different one of the plurality of intents; and identifying, based on the identified pattern, the intent of the user from the plurality of intents associated with the portion of the language.

Clause 25A. The method of clause 24A, wherein the pattern includes an identifier, and wherein processing the data indicative of the input to identify the pattern comprises: parsing the data indicative of the input to identify the identifier; and identifying, based on the identifier, the pattern.

Clause 26A. The method of clause 25A, wherein the pattern includes both the identifier and a position entity, and wherein parsing the data indicative of the input to identify the identifier comprises: parsing the data indicative of the input to identify the positional entity; and identifying, based on the identifier and the positional identity, the pattern.

Clause 27A. The method of any combination of clauses 24A-26A, wherein the pattern includes a keyword, and wherein parsing the data indicative of the input to identify the identifier comprises: parsing the data indicative of the input to identify the keyword; and identifying, based on the keyword, the pattern.

Clause 28A. The method of any combination of clauses 24A-27A, wherein the pattern includes an entity, and wherein parsing the data indicative of the input to identify the identifier comprises: determining that the data indicative of the input corresponds to the pattern but does not include the entity; and outputting, based on the determination that the data indicative of the input corresponds to the pattern but does not include the entity, a prompt requesting data indicative of additional input specifying the entity.

Clause 29A. The method of clause 28A, wherein receiving the data indicative of the input comprises receiving the data indicative of the additional input specifying the entity, and wherein processing the data indicative of the input further comprises identifying, based on the data indicative of the input and the data indicative of the additional input, the pattern.

Clause 30A. The method of any combination of clauses 16A-29A, further comprising: obtaining a result of performing the operation; and providing the result, via an interface, to a client interfacing with the device to enter the data indicative of the input.

Clause 31A. A device for processing data indicative of an input, the device comprising: means for exposing a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input; means for receiving the data indicative of the input that conforms with the portion of the language provided by the exposed language sub-surface; means for processing the data indicative of the input to identify an intent of the user from a plurality of intents associated with the portion of the language; and means for executing a process associated with the identified intent to perform an operation.

Clause 32A. The device of clause 31A, wherein the means for exposing the language sub-surface comprises means for exposing only the language sub-surface of the plurality of language sub-surfaces.

Clause 33A. The device of any combination of clauses 31A-32A, further comprising: means for determining that the user is able to successfully invoke the plurality of intents associated with the portion of the language within a threshold, and means for exposing, responsive to determining that the user is able to successfully invoke the plurality of intents, a second language sub-surface of the plurality of language sub-surfaces, the second language sub-surface providing a second portion of the language with which a user may interface to enter second data indicative of a second input; means for receiving the second data indicative of the second input that conforms with the second portion of the language provided by the exposed second language sub-surface; means for processing the second data indicative of the second input to identify a second intent of the user from a second plurality of intents associated with the second portion of the language; and means for executing a second process associated with the identified second intent to perform a second operation.

Clause 34A. The device of any combination of clauses 31A-33A, further comprising means for presenting an interface that includes a text entry field that automatically provides one or more suggestions to expose the language sub-surface.

Clause 35A. The device of any combination of clauses 31A-34A, further comprising means for presenting an interface that includes a text entry field that automatically performs an autocomplete operation to expose the language sub-surface.

Clause 36A. The device of any combination of clauses 31A-35A, wherein the language sub-surface comprises a first language sub-surface, wherein the first language sub-surface specifies a transition to a second language sub-surface of the plurality of language sub-surfaces, and wherein the device further comprises means for exposing, responsive to second data from the user identifying the transition, the second language sub-surface of the plurality of language sub-surfaces, the second language sub-surface providing a second portion of the language with which a user may interface to enter second data indicative of a second input.

Clause 37A. The device of clause 36A, further comprising means for presenting an interface that includes a text entry field that automatically performs an autocomplete operation facilitate entry of the data identifying the transition.

Clause 38A. The device of clause 36A, further comprising: means for receiving the second data indicative of the second input that conforms with the second portion of the language provided by the exposed second language sub-surface; means for processing the second data indicative of the second input to identify a second intent of the user from a second plurality of intents associated with the second portion of the language; and means for executing a second process associated with the identified second intent to perform a second operation.

Clause 39A. The device of any combination of clauses 31A-38A, wherein the means for processing the data indicative of the input comprises: means for processing the data indicative of the input to identify a pattern from a plurality of patterns associated with the language, each of the plurality of patterns associated with a different one of the plurality of intents; means for identifying, based on the identified pattern, the intent of the user from the plurality of intents associated with the portion of the language.

Clause 40A. The device of clause 39A, wherein the pattern includes an identifier, and wherein the means for processing the data indicative of the input to identify the pattern comprises: means for parsing the data indicative of the input to identify the identifier; and means for identifying, based on the identifier, the pattern.

Clause 41A. The device of clause 40A, wherein the pattern includes both the identifier and a position entity, and wherein the means for parsing the data indicative of the input to identify the identifier comprises: means for parsing the data indicative of the input to identify the positional entity; and means for identifying, based on the identifier and the positional identity, the pattern.

Clause 42A. The device of any combination of clauses 39A-41A, wherein the pattern includes a keyword, and wherein the means for parsing the data indicative of the input to identify the identifier comprises: means for parsing the data indicative of the input to identify the keyword; and means for identifying, based on the keyword, the pattern.

Clause 43A. The device of any combination of clauses 39A-42A, wherein the pattern includes an entity, and wherein the means for parsing the data indicative of the input to identify the identifier comprises: means for determining that the data indicative of the input corresponds to the pattern but does not include the entity; and means for outputting, based on the determination that the data indicative of the input corresponds to the pattern but does not include the entity, a prompt requesting data indicative of additional input specifying the entity.

Clause 44A. The device of clause 43A, wherein the means for receiving the data indicative of the input comprises means for receiving the data indicative of the additional input specifying the entity, and wherein the means for processing the data indicative of the input further comprises means for identifying, based on the data indicative of the input and the data indicative of the additional input, the pattern.

Clause 45A. The device of any combination of clauses 31A-44A, further comprising: means for obtaining a result of performing the operation; and means for providing the result, via an interface, to a client interfacing with the device to enter the data indicative of the input.

Clause 46A. A computer-readable medium having stored thereon instruction that, when executed, cause one or more processors to: expose a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter data indicative of an input; receive the data indicative of the input that conforms with the portion of the language provided by the exposed language sub-surface; process the data indicative of the input to identify an intent of the user from a plurality of intents associated with the portion of the language; and execute a process associated with the identified intent to perform an operation.

Clause 47A. A system configured to process data indicative of an input, the system comprising: a host device comprising one or more processors configured to: expose a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input; and a client device comprising one or more processors configured to: receiving the data indicative of the input that conforms with the portion of the language provided by the exposed language sub-surface; and output the data indicative of the input to the host device, wherein the one or more processors of the host device are further configured to: process the data indicative of the input to identify an intent of the user from a plurality of intents associated with the portion of the language; and execute a process associated with the identified intent to perform an operation.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the sink device 14 may perform a method or otherwise comprise means to perform each step of the method for which the sink device 14 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the sink device 14 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. A device configured to process data indicative of an input, the device comprising:
one or more processors configured to:
expose a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input;
receive the data indicative of the input that conforms with a portion of the natural language provided by the exposed language sub-surface;
process the data indicative of the input to identify an intent of the user from a plurality of intents associated with the portion of the natural language; and
execute a process associated with the identified intent to perform an operation; and a memory configured to store the data indicative of the input.

2. The device of claim 1, wherein the one or more processors are configured to expose only the language sub-surface of the plurality of language sub-surfaces.

3. The device of claim 1, wherein the one or more processors are further configured to:
determine that the user is able to successfully invoke the plurality of intents associated with the portion of the natural language within a threshold, and
expose, responsive to determining that the user is able to successfully invoke the plurality of intents, a second language sub-surface of the plurality of language sub-surfaces, the second language sub-surface providing a second portion of the natural language with which a user may interface to enter second data indicative of a second input;
receive the second data indicative of the second input that conforms with the second portion of the natural language provided by the exposed second language sub-surface;
process the second data indicative of the second input to identify a second intent of the user from a second plurality of intents associated with the second portion of the natural language; and
execute a second process associated with the identified second intent to perform a second operation.

4. The device of claim 1, wherein the one or more processors are further configured to present an interface that includes a text entry field that automatically provides one or more suggestions to expose the language sub-surface.

5. The device of claim 1, wherein the one or more processors are further configured to present an interface that includes a text entry field that automatically performs an autocomplete operation to expose the language sub-surface.

6. The device of claim 1,
wherein the language sub-surface comprises a first language sub-surface,
wherein the first language sub-surface specifies a transition to a second language sub-surface of the plurality of language sub-surfaces, and
wherein the one or more processors are further configured to expose, responsive to second data from the user identifying the transition, the second language sub-surface of the plurality of language sub-surfaces, the second language sub-surface providing a second portion of the natural language with which a user may interface to enter second data indicative of a second input.

7. The device of claim 6, wherein the one or more processors are further configured to present an interface that includes a text entry field that automatically performs an autocomplete operation facilitate entry of the data identifying the transition.

8. The device of claim 6, wherein the one or more processors are further configured to:
receive the second data indicative of the second input that conforms with the second portion of the natural language provided by the exposed second language sub-surface;
process the second data indicative of the second input to identify a second intent of the user from a second plurality of intents associated with the second portion of the natural language; and
execute a second process associated with the identified second intent to perform a second operation.

9. The device of claim 1, wherein the one or more processors are configured to:
process the data indicative of the input to identify a pattern from a plurality of patterns associated with the language, each of the plurality of patterns associated with a different one of the plurality of intents; and
identify, based on the identified pattern, the intent of the user from the plurality of intents associated with the portion of the natural language.

10. The device of claim 9,
wherein the pattern includes an identifier, and
wherein the one or more processors are configured to:
parse the data indicative of the input to identify the identifier; and
identify, based on the identifier, the pattern.

11. The device of claim 10,
wherein the pattern includes both the identifier and a position entity, and
wherein the one or more processors are configured to:
parse the data indicative of the input to identify the positional entity; and
identify, based on the identifier and the positional identity, the pattern.

12. The device of claim 9,
wherein the pattern includes a keyword, and
wherein the one or more processors are configured to:
parse the data indicative of the input to identify the keyword; and
identify, based on the keyword, the pattern.

13. The device of claim 9,
wherein the pattern includes an entity, and
wherein the one or more processors are configured to:
determine that the data indicative of the input corresponds to the pattern but does not include the entity; and
output, based on the determination that the data indicative of the input corresponds to the pattern but does not include the entity, a prompt requesting data indicative of additional input specifying the entity.

14. The device of claim 13, wherein the one or more processors are configured to:
receive the data indicative of the additional input specifying the entity; and
identify, based on the data indicative of the input and the data indicative of the additional input, the pattern.

15. The device of claim 1, wherein the one or more processors are further configured to:
obtain a result of performing the operation; and
provide the result, via an interface, to a client interfacing with the device to enter the data indicative of the input.

16. A method of processing data indicative of an input, the method comprising:
exposing a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input;
receiving the data indicative of the input that conforms with a portion of the natural language provided by the exposed language sub-surface;
processing the data indicative of the input to identify an intent of the user from a plurality of intents associated with the portion of the natural language; and
executing a process associated with the identified intent to perform an operation.

17. The method of claim 16, wherein exposing the language sub-surface comprises exposing only the language sub-surface of the plurality of language sub-surfaces.

18. The method of claim 16, further comprising:
determining that the user is able to successfully invoke the plurality of intents associated with the portion of the natural language within a threshold, and
exposing, responsive to determining that the user is able to successfully invoke the plurality of intents, a second language sub-surface of the plurality of language sub-surfaces, the second language sub-surface providing a second portion of the natural language with which a user may interface to enter second data indicative of a second input;
receiving the second data indicative of the second input that conforms with the second portion of the natural language provided by the exposed second language sub-surface;
processing the second data indicative of the second input to identify a second intent of the user from a second plurality of intents associated with the second portion of the natural language; and
executing a second process associated with the identified second intent to perform a second operation.

19. The method of claim 16, further comprising presenting an interface that includes a text entry field that automatically provides one or more suggestions to expose the language sub-surface.

20. The method of claim 16, further comprising presenting an interface that includes a text entry field that automatically performs an autocomplete operation to expose the language sub-surface.

21. The method of claim 16,
wherein the language sub-surface comprises a first language sub-surface,
wherein the first language sub-surface specifies a transition to a second language sub-surface of the plurality of language sub-surfaces, and
wherein the method further comprises exposing, responsive to second data from the user identifying the transition, the second language sub-surface of the plurality of language sub-surfaces, the second language sub-surface providing a second portion of the natural language with which a user may interface to enter second data indicative of a second input.

22. The method of claim 21, further comprising presenting an interface that includes a text entry field that automatically performs an autocomplete operation facilitate entry of the data identifying the transition.

23. The method of claim 21, further comprising:
receiving the second data indicative of the second input that conforms with the second portion of the natural language provided by the exposed second language sub-surface;
processing the second data indicative of the second input to identify a second intent of the user from a second plurality of intents associated with the second portion of the natural language; and
executing a second process associated with the identified second intent to perform a second operation.

24. The method of claim 16, wherein processing the data indicative of the input comprises:
processing the data indicative of the input to identify a pattern from a plurality of patterns associated with the language, each of the plurality of patterns associated with a different one of the plurality of intents; and identifying, based on the identified pattern, the intent of the user from the plurality of intents associated with the portion of the natural language.

25. The method of claim 24,
wherein the pattern includes an identifier, and
wherein processing the data indicative of the input to identify the pattern comprises:
parsing the data indicative of the input to identify the identifier; and
identifying, based on the identifier, the pattern.

26. The method of claim 25,
wherein the pattern includes both the identifier and a position entity, and
wherein parsing the data indicative of the input to identify the identifier comprises:
parsing the data indicative of the input to identify the positional entity; and
identifying, based on the identifier and the positional identity, the pattern.

27. The method of claim 24,
wherein the pattern includes a keyword, and
wherein parsing the data indicative of the input to identify the identifier comprises:
parsing the data indicative of the input to identify the keyword; and
identifying, based on the keyword, the pattern.

28. The method of claim 24,
wherein the pattern includes an entity, and
wherein parsing the data indicative of the input to identify the identifier comprises:
determining that the data indicative of the input corresponds to the pattern but does not include the entity; and
outputting, based on the determination that the data indicative of the input corresponds to the pattern but does not include the entity, a prompt requesting data indicative of additional input specifying the entity.

29. The method of claim 28,
wherein receiving the data indicative of the input comprises receiving the data indicative of the additional input specifying the entity, and
wherein processing the data indicative of the input further comprises identifying, based on the data indicative of the input and the data indicative of the additional input, the pattern.

30. The method of claim 16, further comprising:
obtaining a result of performing the operation; and
providing the result, via an interface, to a client interfacing with the device to enter the data indicative of the input.

31. A non-transitory computer-readable medium having stored thereon instructions that, when executed, cause one or more processors to:
expose a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter data indicative of an input;
receive the data indicative of the input that conforms with a portion of the natural language provided by the exposed language sub-surface;
process the data indicative of the input to identify an intent of the user from a plurality of intents associated with the portion of the natural language; and execute a process associated with the identified intent to perform an operation.

32. A system configured to process data indicative of an input, the system comprising:
  a host device comprising one or more processors configured to:
  expose a language sub-surface specifying a natural language containment hierarchy defining a grammar for a natural language as a hierarchical arrangement of a plurality of language sub-surfaces, each of the language sub-surfaces specifying a corresponding set of syntax rules and strings permitted for the natural language with which a user may interface to enter the data indicative of the input; and
  a client device comprising one or more processors configured to:
  receiving the data indicative of the input that conforms with a portion of the natural language provided by the exposed language sub-surface; and
  output the data indicative of the input to the host device, wherein the one or more processors of the host device are further configured to:
  process the data indicative of the input to identify an intent of the user from a plurality of intents associated with the portion of the natural language; and
  execute a process associated with the identified intent to perform an operation.

\* \* \* \* \*